US011538126B2

(12) United States Patent
Vemury

(10) Patent No.: US 11,538,126 B2
(45) Date of Patent: Dec. 27, 2022

(54) IDENTITY VERIFICATION SYSTEM AND METHOD

(71) Applicant: The Government of the United States of America, as represented by the Secretary of Homeland Security, Washington, DC (US)

(72) Inventor: Arun Vemury, North Bethesda, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 15/223,172

(22) Filed: Jul. 29, 2016

(65) Prior Publication Data

US 2017/0032485 A1   Feb. 2, 2017

Related U.S. Application Data

(60) Provisional application No. 62/198,776, filed on Jul. 30, 2015, provisional application No. 62/221,436, filed on Sep. 21, 2015.

(51) Int. Cl.
*G06Q 50/26* (2012.01)
*G06F 16/22* (2019.01)
(Continued)

(52) U.S. Cl.
CPC .......... *G06Q 50/265* (2013.01); *G06F 16/22* (2019.01); *G06F 16/9535* (2019.01); *G06Q 50/30* (2013.01)

(58) Field of Classification Search
CPC ...... G06Q 50/265; G06Q 50/30; G06F 16/22; G06F 16/9535
(Continued)

(56) References Cited

U.S. PATENT DOCUMENTS 8,533,485 B1 * 9/2013 Bansal .................... H04L 63/08
380/243
8,677,139 B1   3/2014 Kalocsai
(Continued)

OTHER PUBLICATIONS

Verifiable Credentials Use Cases, W3C Working Group Note Sep. 24, 2019, https://www.w3.org/TR/2019/NOTE-vc-use-cases-20190924.
(Continued)

*Primary Examiner* — Zeshan Qayyum
(74) *Attorney, Agent, or Firm* — Lavanya Ratnam; Nathan Grebasch; Robert W. Busby

(57) ABSTRACT

Collection, validation, accuracy checking, and matching of information for individuals, e.g., in-scope people entering/exiting a country is described. The systems, techniques, devices, methods, and approaches described herein can be used to collect biographic, biometric, and travel information for persons who enter a country with the expectation that the person will eventually exit. The system and method described herein include structures and procedures for determining whether the individual, based on his/her information, meets a predefined criterion that is associated with predefined procedures, e.g., special precautions are to be implemented. This document also describes how information for an individual can be matched with an existing record in order to ensure accurate recordkeeping.

23 Claims, 9 Drawing Sheets

(51) Int. Cl.
*G06F 16/9535* (2019.01)
*G06Q 50/30* (2012.01)

(58) Field of Classification Search
USPC .......................................................... 705/50
See application file for complete search history.

(56) References Cited

U.S. PATENT DOCUMENTS

| | | | | |
|---|---|---|---|---|
| 9,560,165 | B2* | 1/2017 | Liu | H04L 67/06 |
| 2005/0167484 | A1* | 8/2005 | Sussman | G07F 7/1008 |
| | | | | 235/380 |
| 2006/0055512 | A1* | 3/2006 | Chew | G07C 9/37 |
| | | | | 705/13 |
| 2006/0293892 | A1* | 12/2006 | Pathuel | G06F 21/32 |
| | | | | 704/246 |
| 2010/0138246 | A1* | 6/2010 | Carey | G06Q 10/02 |
| | | | | 705/7.18 |
| 2011/0087888 | A1* | 4/2011 | Rennie | H04L 63/08 |
| | | | | 713/182 |
| 2011/0211735 | A1 | 9/2011 | Langley | |
| 2011/0231212 | A1* | 9/2011 | Hurley | B64F 1/366 |
| | | | | 705/5 |
| 2011/0231911 | A1* | 9/2011 | White | G06F 21/32 |
| | | | | 726/7 |
| 2012/0036071 | A1 | 2/2012 | Fulton et al. | |
| 2012/0159600 | A1* | 6/2012 | Takagi | G06F 21/32 |
| | | | | 726/7 |
| 2013/0212655 | A1* | 8/2013 | Hoyos | G06K 9/00107 |
| | | | | 726/5 |
| 2013/0262305 | A1* | 10/2013 | Jones | H04B 5/0031 |
| | | | | 705/44 |
| 2013/0324086 | A1* | 12/2013 | Celi, Jr. | H04W 12/06 |
| | | | | 455/411 |
| 2014/0100895 | A1 | 4/2014 | Chen | |
| 2014/0279640 | A1* | 9/2014 | Moreno | G06Q 50/265 |
| | | | | 705/325 |
| 2014/0313007 | A1* | 10/2014 | Harding | G07C 9/37 |
| | | | | 340/5.52 |
| 2014/0363058 | A1* | 12/2014 | Emmett | G06V 40/193 |
| | | | | 382/117 |
| 2015/0063657 | A1 | 3/2015 | Poder et al. | |
| 2016/0180078 | A1* | 6/2016 | Chhabra | G06F 21/57 |
| | | | | 726/19 |

OTHER PUBLICATIONS

Prosecution of U.S. Appl. No. 16/363,474 (US Patent Application Publication 2019/0220943), first named inventor Arun Vemury.
Prosecution of U.S. Appl. No. 16/366,584 (US Patent Application Publication 2019/0220944), first named inventor Arun Vemury.
Prosecution of U.S. Appl. No. 16/150,690 (US Patent Application Publication 2019/0043148), first named inventor Arun Vemury.
Prosecution of U.S. Appl. No. 16/594,891, first named inventor Daniel Boyd.
Prosecution of U.S. Appl. No. 16/595,095, first named inventor Daniel Boyd.

* cited by examiner

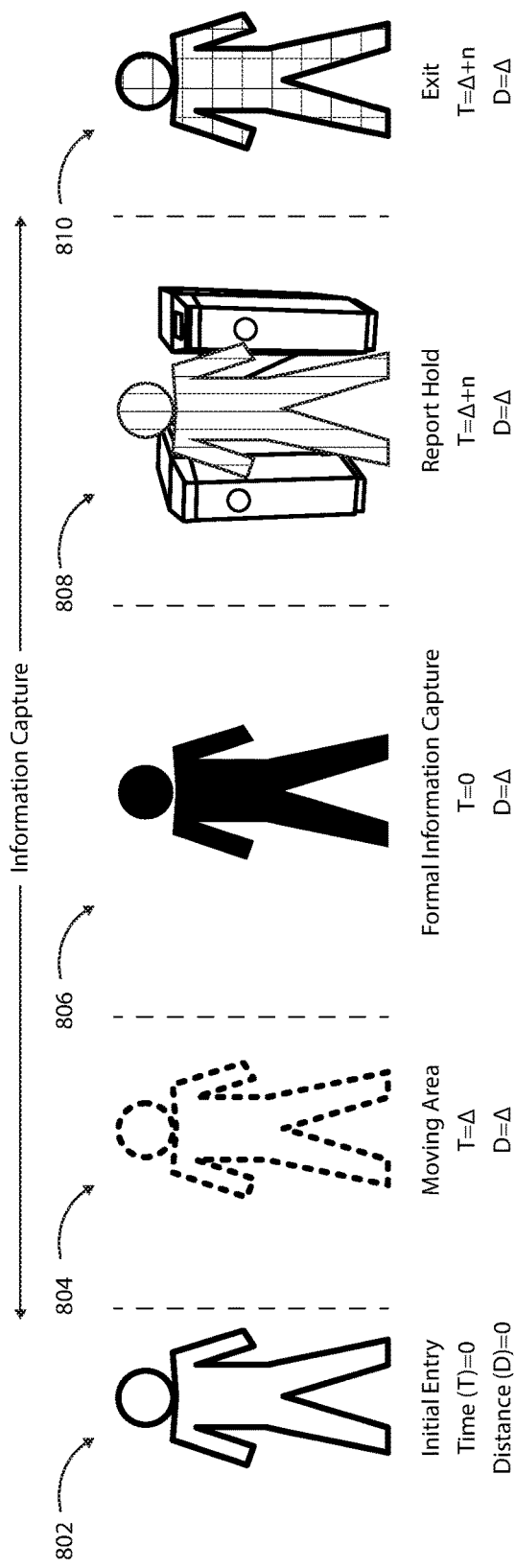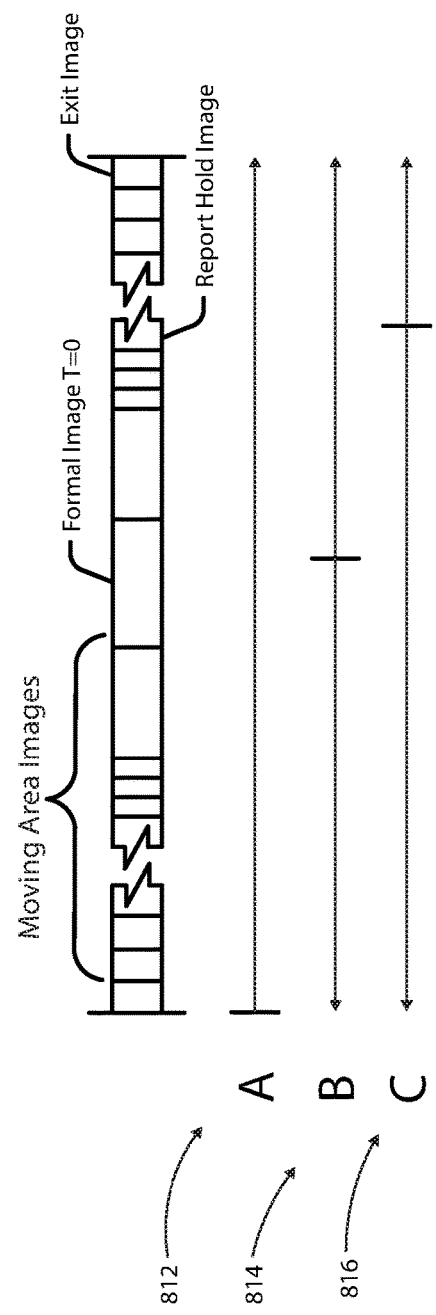

IDENTITY VERIFICATION SYSTEM AND METHOD

CROSS-REFERENCE

This application claims the benefit under 35 U.S.C. § 119(e) to U.S. Provisional Patent Application No. 62/198,776, filed on Jul. 30, 2015 entitled "Identity Verification System and Method" and U.S. Provisional Patent Application No. 62/221,436 filed on Sep. 12, 2015 entitled "Identity Verification System and Method," the disclosures of both of which are hereby incorporated herein, in their entireties, by this reference.

GOVERNMENT RIGHTS

This invention was made with United States Government support. The Government has certain rights in this invention.

FIELD OF THE DISCLOSURE

This application relates to collecting identifying information, matching, and identifying individuals based on collected information. Embodiments support the screening of individuals (e.g., people) entering/exiting a country. In embodiments, one or more databases are used to collect, store, and access information, such as biographic information, travel and bio-identification information, to identify individuals.

BACKGROUND

Large numbers of people routinely cross international borders each day. Some statistics indicate approximately one million individuals pass through United States (U.S.) Customs on a daily basis. Customs officials, such as U.S. Customs and Border Patrol (CPB) Officers, have the responsibility not only to check the identities of these individuals, but also to interdict illegal merchandise, drugs, weapons, etc.

Persons entering/exiting the U.S. are categorized as being in-scope or out-of-scope. In-scope and out-of-scope individuals are handled in different ways. For instance, an in-scope individual may be screened differently than that of an out-of-scope person.

Out-of-scope individuals include U.S. citizens, permanent residents, diplomats, and so on. In-scope individuals include foreign visitors, and those who are not "out-of-scope." Categorization of persons as in-scope or out-of-scope is done in-part because in-scope individuals are scheduled to depart the country, e.g., when his/her visa expires, while out-of-scope persons are exempt (e.g., diplomats) or are citizens who have a right to enter the country.

Customs officials, e.g., CBP Officers, are responsible for determining whether individuals can properly enter the U.S. While non-citizens from some countries are permitted into the U.S. without a visa due to an agreement between the U.S. and the non-citizen's country of residence/nationality, other non-citizens are required to obtain a visa to enter the U.S.

For example, Jan Jorgenson, visiting the U.S. from Europe, may undergo different screening procedures than a U.S. citizen, a permanent resident, or a diplomat when entering the U.S. by air. This partly may be done because Jan is anticipated to exit the U.S. once his trip is over, such as in three weeks after having visited Mount Rushmore, Teton, Yellowstone, Glacier National Park, Acadia, and Shenandoah National Parks.

CBP, as part of its duties, maintains records in order to enforce U.S. laws and help state, local, and tribal officials fulfill their missions. For example, CBP may locate a suspect in state criminal matters as part of border screening. Well-maintained records help maintain national security. Customs-related records can be used to prevent terroristic activity associated with non-citizens entering a country, such as the United States, illegally or under false pretenses.

SUMMARY

Collection, validation, accuracy checking, and matching of information for individuals, e.g., in-scope people entering/exiting a country is described. The systems, techniques, devices, methods, and approaches described herein can be used to collect biographic, biometric, and travel information for persons who enter a country with the expectation that the person will eventually exit. The system and method described herein include structures and procedures for determining whether the individual, based on his/her information, meets a predefined criterion that is associated with pre-defined procedures, e.g., special precautions are to be implemented. This document also describes how information for an individual can be matched with an existing record in order to ensure accurate recordkeeping. This document further describes routing individuals through an evaluation process and construction, operation, and maintenance of a massive biographic/biometric data system. Additionally, configuring and operating a biometric information handling system in a generic manner is described. Embodiments of biometric matching systems that operate agnostically of components with such systems that implement proprietary technologies are also described.

This Summary introduces concepts, in a simplified form, that are further described below in the Detailed Description. This Summary is not intended to identify key features or essential features of the claimed subject matter, nor to limit the scope of the claimed subject matter.

BRIEF DESCRIPTION OF THE DRAWINGS

The same numbers are used throughout the drawings to reference like features.

FIG. 8A is a graphical illustration of an individual entering, proceeding, screening, and exiting an area that implements biometric matching, such as facial recognition screening.

FIG. 8B is a graphic illustration of biometric information capture, such as that described in conjunction with FIG. 8A. Example approaches for biometric information selection are also illustrated.

DETAILED DESCRIPTION

Overview

Figure 1:
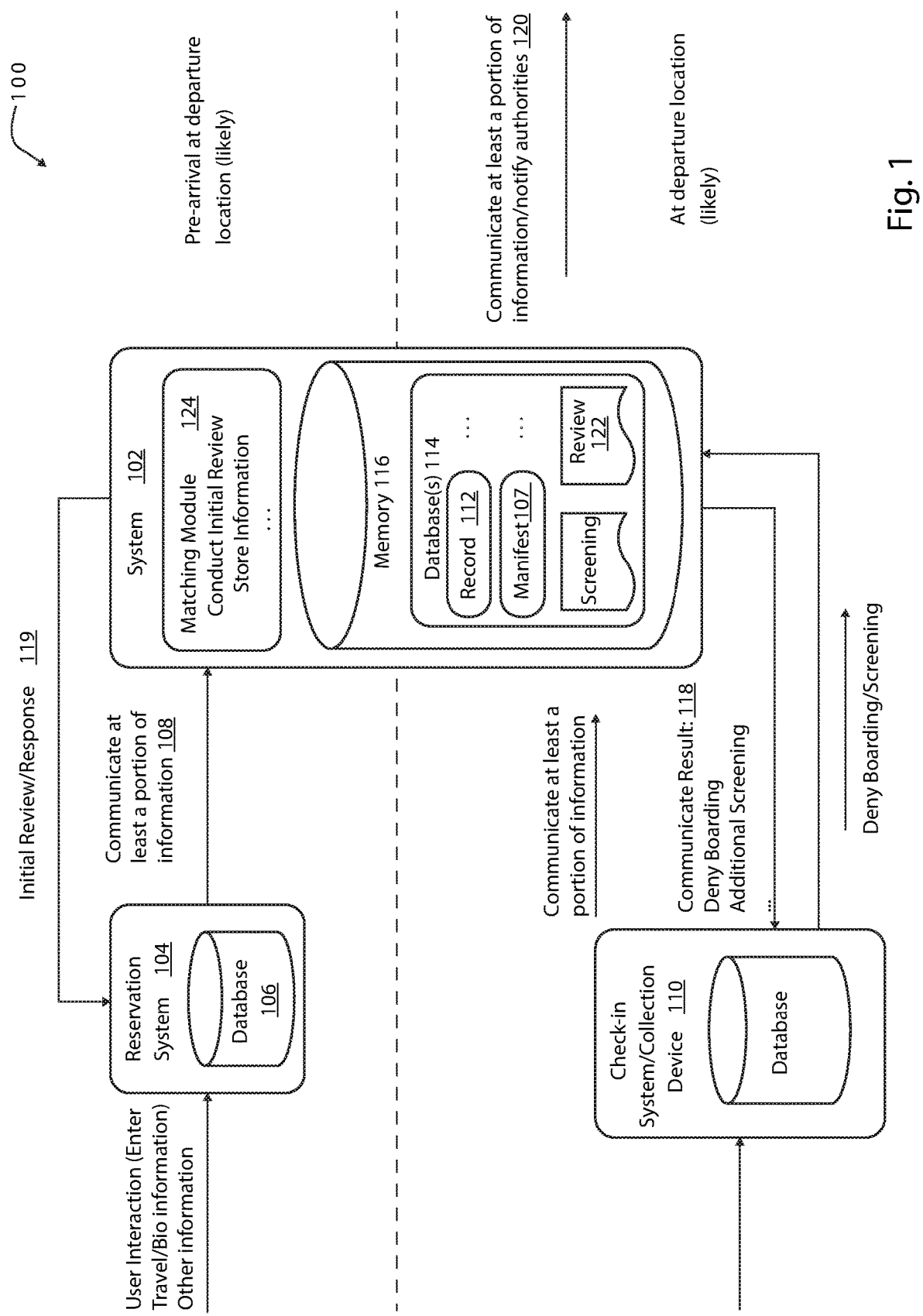
FIG. 1 illustrates example external systems, and accompanying data-flows, illustrating interactions with a system in accordance with the present disclosure.

Collecting, maintaining, and matching records to identify individuals entering and leaving a country is a daunting and time-consuming task. Take for example, a scenario in which approximately one million people enter or exit a country daily. Presuming an equal number of persons enter and leave on any given day, at the end of even a short period, matching a person leaving the country with his or her entry record may involve matching him or her to one of several million records. This can make it difficult to identify individuals. This scenario ignores out-of-scope persons, who are handled in different ways.

Handling massive numbers of transactions on a routine basis imposes unique challenges on data systems (e.g., processing challenges, procedural challenges, hardware constraints) that do not manifest in comparatively smaller systems. For example, the challenges do not scale in comparison to data systems handling tens of thousands of transactions on a daily basis. Example massive data handling systems handle on the order of one-hundred thousand to one million, about one million transactions, or several million transactions on a daily basis. These transactions can include biometric and biographic information handling.

Further complicating matters is the fact that customs facilities operate in different time zones, some facilities are in different countries, and facilities have a wide variety of configurations. Examples of the latter situation are airports that lack space or have configurations that do not accommodate efficient screening. Screening is problematic as large numbers of individuals usually arrive for screening at approximately the same time. Monday mornings and Friday evenings, for example, are times at which airports experience a large influx of persons who are to be screened in a short time period.

Another challenge in operating a data system handling identification-type tasks is that biometric information (e.g., facial recognition data, fingerprint data) is extremely large in comparison to biographic information (e.g., passport information, flight information). Facial recognition data, for example, may be several to tens of megabytes in size while biographic information is tens of kilobytes in size. As a result, there is an asymmetry in file size between biometric and biographic information. While a signature of the biometric information, such as a hash of an image, can be used to minimize the size of the information, handling, storing, processing, and communicating biometric information raises unique challenges. As is to be appreciated, hardware included in such a system also has to accommodate these issues. Additionally, the use of biographic information may be emphasized to minimize the computational and communication burden associated with biometric information. In some instances, the systems, methods, techniques and approaches described herein dynamically adjust based on discrepancies in biometric and biometric information, a change in predetermined threshold, and so forth. For example, the system may specify a higher level of facial recognition when, for example, a captured fingerprint image is of poor quality. In another example, biometric data collection and identification thresholds are increased based on biometric information, e.g., an individual is biometrically screened to a higher degree in comparison to an average individual because he/she is using a new passport.

An additional challenge with biometric information is that commercial vendors implement proprietary identification algorithms, data formats, and so on that pose integration concerns, particularly for systems that implement biometric information from a variety of suppliers, data formats, and identification algorithms. The systems described herein can be designed and operated to genericize data so the system operates in an agnostic manner. For example, a central resource maintains biometric information in a generic format that is different from a format used by a device to capture an image or derive information from an image.

In this manner, the "back-end" portion of the system operates in an agnostic manner, e.g., without regard for the technology (algorithm, data format, etc.) implemented by end user portions of the system, e.g., kiosks, access control devices, workstations. A system configured and operated in this manner can permit the system to dynamically adjust based on a variety of factors including, but not limited to, changes in threat level, differing levels of identification based on biometric dynamic thresholding, and so on. The foregoing can be applied in a manner to apply different procedures, levels of review, and so forth while maximizing overall throughput. Additionally, the system can be configured to conduct biometric identification matching, such as facial image matching, agnostically or in a proprietary manner. For instance, matching can be performed using generic data or the generic data can be used by a proprietary algorithm (e.g., a non-generic algorithm). It will also be appreciated that the system, or a component thereof, can capture, store, compare, identify, and maintain information, whether biometric or biographic, in forms that contains less than all the information. Example systems and methods use a signature that is indicative of the image, such as a hash of the image, a compressed version of the image, or a portion thereof (e.g., information that is indicative of the image to a predetermined level).

Individuals need to be identified in an efficient manner to minimize dissatisfaction and ensure accurate records maintenance. For example, while identification and records management are performed to a predefined threshold to ensure integrity, the system can be configured to apply additional scrutiny based on a variety of factors, such as recently issued or replaced biographic documents, biometric identification issues (e.g., poor fingerprints), heightened scrutiny levels, and so on. Data integrity issues can arise as an individual may transit through a large number of facilities, multiple people with similar biographical or travel documentation may transit at approximately the same time, or biometric information and/or identification is based on a poor image capture (e.g., facial recognition is based on an image that is at or near tolerance). Another complication is that people routinely lose travel documents, change names, and so forth.

Matching an individual exiting a country to his or her entry record is important as it is the last point at which the person is physically within that country's jurisdiction. For example, inadvertently confusing two individuals with the same name can create inconsistent records and raise issues when the later-to-exit person attempts to leave the country. Other scenarios that highlight the importance of maintaining accurate records include a person attempting to illegally use another person's identity or switching identities, e.g., using travel documents with different identities to enter and leave the country. In other examples, individuals may surgically alter their appearance for benign reasons or to permit them to improperly use biographic information, such as a stolen passport.

Although this application discloses embodiments, implementations, and scenarios involving customs records management, the principles of the present disclosure apply to other situations and environments. The techniques, approaches, software, firmware, and hardware described herein may be utilized where information is managed, collected, exchanged, vetted, or otherwise compared. Other situations that can benefit from this technology include, but are not limited to, customer check-ins, vehicle registrations, driver license registrations, permit collection (e.g., building permits), identification of individuals, correctional institutions settings, massive data systems (whether containing biometric and/or biographic data) and the like. In situations, the techniques, approaches, concepts, software, firmware, and hardware described herein are implemented to obtain, identify, store, check, verify, authenticate, and match information for individuals. Example information includes, but is not limited to, biographic information, travel information, biometric information, and a unique identifier that associates such information, e.g., a bar code, record locator (a record "number"), etc. It is the intention of this document to encompass and include such embodiments.

Below, a section entitled "Example Data Flow" describes how information can be handled and passed to effectuate accurate information matching to ensure accurate record-keeping for substantially all in-scope persons who enter a country. Methods, data flows, techniques, approaches, and devices and software implementing these can be designed and operate to accommodate a massive number of transactions per unit of time, e.g., on a daily basis. While example data flows are described in conjunction with biometric data, data systems that operate in an agnostic manner and/or that are involved in a massive number of tractions and/or that handle information that in total comprises a large size can benefit from the present disclosure. After that, a section entitled "Operating Environment" describes an example environment in which the various embodiments can be employed. Following this, an "Example Methods" section describes accurate information matching to ensure accurate recordkeeping. While the systems, hardware, software, techniques, methods, and approaches are described in relationship to particular implementations the underlying principles disclosed herein can be combined, adjusted, or manipulated as contemplated by one of ordinary skill.

FIG. 1

Prior to describing an example operating environment, further information is provided regarding how the systems and environment are impacted by other systems, processes, and so on (see generally environment 100 in FIG. 1). With reference to FIG. 1, an individual, e.g., a person, prior to interfacing with a system 102 in accordance with the present disclosure, interacts with other systems that in turn interact or are communicatively interconnected with systems or components of systems encompassed by the present disclosure.

For example, an individual that is in-scope may establish a reservation with a common carrier via a reservation system 104, e.g., a computer system configured to accept travel arrangements. Example common carriers include, but are not limited to, airlines (air carriers), train lines, ship or cruise lines, bus lines, automobile transport services, and so forth. In this scenario, the individual inputs or can be assigned travel information that is shared, forwarded, used as a point of comparison, and combinations thereof for the system 102, using methods, techniques, and approaches implemented by the present technology.

For example, an in-scope individual, Jan Jorgensen, makes a reservation to travel from Stockholm, Sweden to Denver Colo.'s Stapleton International Airport using an airline reservation system 104 constructed to facilitate purchase of an airline ticket and related matters. For this example, Jan is a citizen of a European country that is permitted to travel to the U.S. without the need for a visa. Thus, Jan might not directly interact with U.S. customs or embassy officials or supporting systems until he arrives for departure. The information input by Jan, or on Jan's behalf, in addition to information provided by the reservation system 104 of the airline, can be entered into a database 106 for the reservation system 104.

In some instances, such as with Jan's permission, information associated with the individual (e.g., Jan's name, age, gender, citizenship, and so forth) is communicated to the system 102. Although the information can be forwarded independently, e.g., as information solely related to Jan, in other instances the information, or a portion thereof, is communicated with information of other individuals being transported by the common carrier, such as in a flight manifest. As illustrated the system stores information from the manifest in a manifest record 107 in database 114, such as a manifest database. In other instances, Jan's information is communicated with that of others in Jan's travel party or with information of individuals of the same type or class. An example of the former is communicating Jan's information with that of family members traveling with him. An example of the latter situation is communicating Jan's information with that of others on an "enhanced review," presuming Jan's information qualifies him for this status.

An individual's information, in embodiments, is transmitted 108 to the system 102 prior to that person being interviewed by a customs official even though the interview occurs in a location from which the individual is departing, e.g. Stockholm Sweden for Jan. While the system can receive the information at any time prior to arrival, in embodiments at least a portion of the individual's information is transmitted 108 at or approximately at seventy-two hours before expected arrival/screening. In other instances, information is transmitted 108 at or approximately at twenty-four hours before arrival/screening.

In other embodiments, information is communicated at various times depending on a variety of factors. For example, information for an individual who is apparently not authorized for travel, is authorized for travel with pre-established precautions, or the like is communicated at different times. Information for an individual who (apparently) is not permitted to travel to his/her destination country can be communicated earlier than information of other travelers.

The information can be communicated multiple times in situations where the system 102 performs multiple reviews, information is updated, and so on. This can permit the system 102 to select individuals corresponding to different classifications, to select individuals at various times, and/or to account for data updates, travel cancelations, or changes that can occur up to screening or boarding. For example, in an embodiment, information about persons purchasing only one-way tickets, persons paying cash, persons paying with a debit card that is not associated with an identity, persons who purchased their tickets at "the last minute", and persons exhibiting similar specific behaviors is forwarded to the system 102 prior to communicating information for other individuals.

The information so far provided could be approved, authenticated, and/or validated, such as by using the reservation system 104 to associate the information with a token, e.g., an identity token like a passport. In other instances the information is communicated without this having occurred. An example of the latter situation is an individual who merely provided biographic information that is not associated with a token. For example, the traveler fails to provide a passport number associated with a passport that uniquely identifies himself/herself. Other examples of tokens include identification tokens such as a driver's licenses, identification credentials, and the like.

In embodiments, biographic information such as travel information is included in a particular format, e.g., a record, illustrated as record 112 stored in a database 114 in memory 116. This format can be the same format, or a colorable version of a record format used by the system, e.g., in a format that facilities data extraction or is forwards/backwards compatible with a record format implemented by the system 102. For example, the information is encoded in UNICODE (Unicode Consortium, Mountain View, Calif.) text format and/or in a particular file format, such as comma delimited file format, also known as comma separated file format or values (CSV). The reservation system 104, in this case, can provide a colorable version by communicating 108 at least some of the information in a format that identifies the data contained therein to the system 102.

For example, the information provided by the reservation system 104 complies with extensible markup language (XML) format, a variation thereof, or a like schema, so the system 102 can identify the information based on its defined properties, e.g., XML tags. For example, the name "Jan" has the property of given, or first name, while "Jorgenson," Jan's last name, has the property last name, or surname. Thus, the system 102 can parse the information into the proper fields in order to make the information usable by the system 102, minimize the individual's time, and streamline the overall process. The system 102 can implement a variety of protocols to support populating information into a particular structure, e.g., an entry record 112.

Metadata can be included with the information in order to describe the information. Example metadata includes, but is not limited to, payment method, trip type (e.g., one-way), time of purchase, amount of time prior to trip, location/area where the travel was purchased, IP address of computing device used to make purchase, carrier reward number (frequent flyer number), data entry time, and validation checking results (e.g., nature of errors made). Other metadata includes the language used by interface used to consummate purchase, ticket delivery, subsequent travel changes/updates, information regarding other persons in travel party, seat preference, meal preference, purchase history, visa duration, visa issuing location, biometric information, and the like information. Information provided as metadata also can be included itself as other data, e.g., the metadata is included itself in a record 112.

Also, other information can be included with the biographic information such as the travel information. For example, a unique record identifier or session identifier is added to the individual's information to identify one or more transactions that gave rise to the information. A common schema can be implemented between the reservation system 104 and the system 102 to substantially ensure security, permit time stamping, identify different versions of the data, and so on.

In some instances, information received by or generated by the system 102 is returned. In FIG. 1, initial review/response 119 is returned to the reservation system 104. Similarly, result 118 is returned to check-in system/collection device 110 Check-in system/collection device 110 is operated by a common carrier, a travel facility (e.g., a terminal or airport), law enforcement, customs, or another governmental entity.

For example, responsive to the system 102 determining that Jan is not to board his flight, he receives a notification via the check-in system/collection device 110, of the airline, of this decision (notification result 118). Such a notification result 118 can be sent to a check-in system/collection device 110, and/or communicated 120 to a computer system for a law enforcement entity (e.g., a fixed or mobile device), to a governmental entity, to a travel facility, to a smart phone (e.g., Jan's mobile telephone), to a reservation system 104, to combinations thereof, and so on. In other instances, the system 102 originates the message containing the notification result 118.

In some instances, a notification result 118 provides additional information or instructions. For instance, responsive to an initial review, the system can provide visual or audible instructions recommending additional screening or a suggestion, in a notification result 118. Although the individual can be directly notified, e.g., by a kiosk system, in other instances the information is communicated 120 to authorities such as customs officials (via a computer system) for the departure country, an intermediate country through which the individual will pass, or to customs officials for the destination country, e.g., to a computer system configured to support customs officials for the destination country that are physically located in the departure country. The foregoing situations and protocols will be discussed herein, below, and/or be apparent based on the following descriptions.

In other embodiments, another system (e.g., a reservation system 104 of an airline or a check-in system/collection device 110) initially classifies an individual as "in-scope" or "out-of-scope". Although the foregoing can be performed based on the information provided by the person (e.g., based on inferential information) or by information provided by the common carrier, in other embodiments it is done based on the person's input, such as user inputting that he/she is in or out of scope, or on direct information.

In additional embodiments, the system 102 makes an initial determination of whether the individual is in-scope or out-of-scope. Embodiments include making a single determination or iterative determinations. The iterative determination may be performed a predetermined number of times, until a threshold is met, until a determination is made that a predetermined threshold cannot be met, and so forth. It should be appreciated that other iterative process described herein can be performed in a similar manner. Although not restrictive of the environment 100, the foregoing helps in understanding the environment 100. This determination can be part of an initial check of information, e.g., a review for accuracy and/or validity.

In some instances, the system 102 communicates 120 at least a portion of the information to authorities such as by communicating with a law enforcement system. The determination whether to alert others (e.g., law enforcement) can be based on a variety of factors and accomplished using various approaches, techniques, and methods. For example, the system 102 uses a lookup table or other computing structure to determine whether information associated with the individual meets a predetermined criterion, and if so, what action is to be taken (illustrated as review 122).

For example, the system 102 uses a look-up table, such as may be stored in memory 116, to determine that a person is in-scope and has a name that is an alias of a criminal (the person need not necessarily be the criminal). In this case, the system 102 instructs that the individual be asked for additional forms of identification, e.g., by a check-in system/collection device 110. A matching module 124 such as a program can be used to determine whether a person's information is a match with a particular action. Matching module 124 is described further below and can perform such tasks. Other example actions include, but are not limited to, detaining the person, preventing the person from traveling, taking additional precautions, restricting a mode of transportation of the person, and so forth, and combinations thereof.

These actions can be provided as prompts, such as pop-ups, email messages, instant messages, audible (e.g., voice) messages, and so on that are communicated via a variety of technologies, e.g., a cellular communication, a wireless communication (802.11-type specification), a wired network, or combinations thereof. For instance, a customs officer that is to perform a primary interview receives a visual, audible, or tactile prompt at his/her workstation via a computer system such as a mobile device.

A variety of algorithms can be used to determine whether one or more factors of a traveler's information sufficiently matches a criterion. Example algorithms are based on predictive or descriptive modeling, probabilistic modeling (e.g., risk modeling), and so forth. In embodiments, the system 102 employs one or more analytical techniques, algorithms, modeling techniques, etc., to make this determination. In some embodiments, these algorithms are embodied in the matching module 124, e.g., a computer readable code that causes the matching module 124 to make this determination.

Additional reference will be made to FIG. 1 to explain structures, methods, systems, components, concepts of operation, and so forth that are relevant to, but not restrictive to the environment 100.

Operating Environment

FIG. 2

Figure 2:
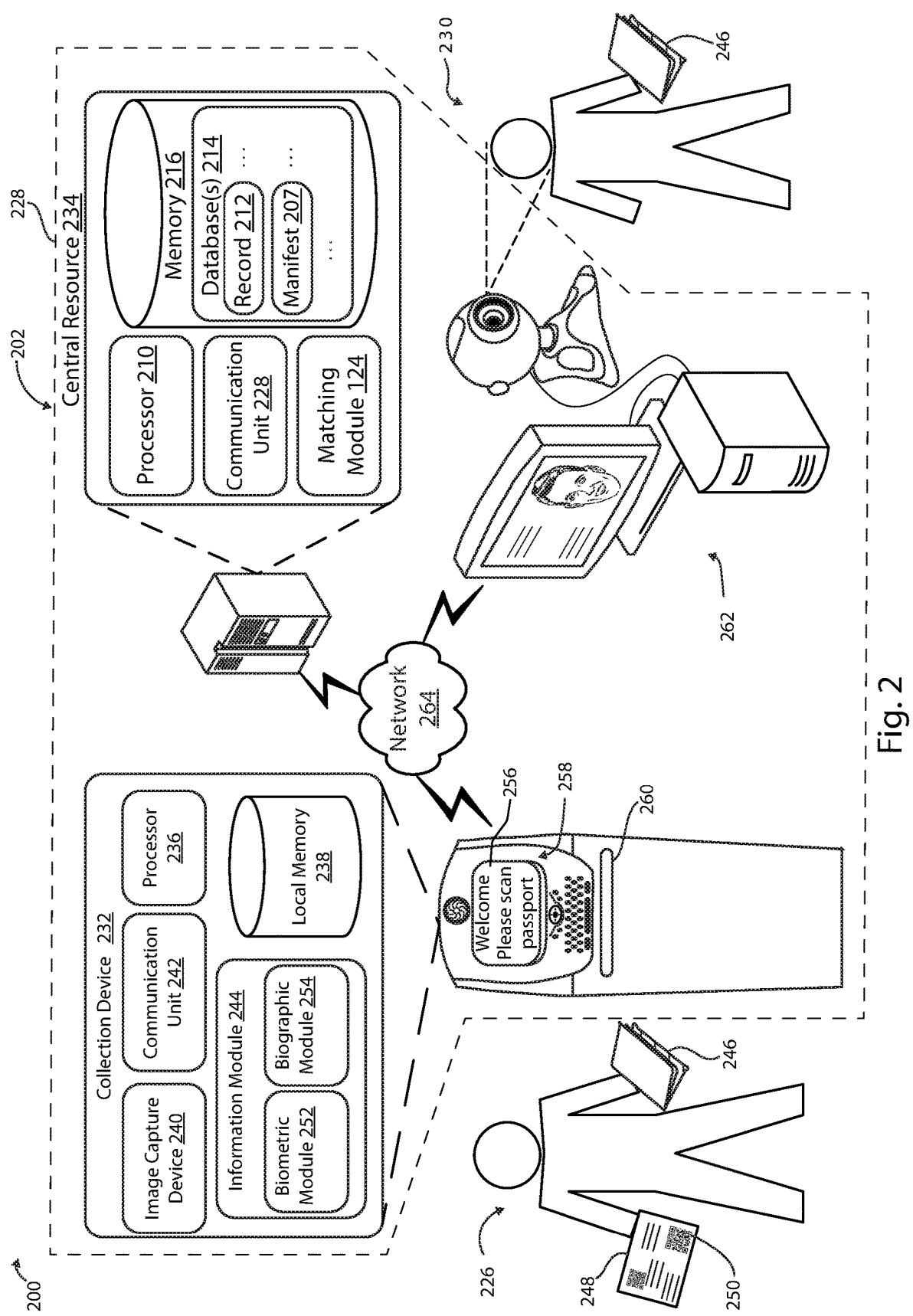
FIG. 2 illustrates an operating environment in which the inventive principles can be employed in accordance with one or more embodiments. Although the accompanying description describes interactions with the other system of FIG. 1, it is not to be taken as a requirement that the system interact with another system.

FIG. 2 illustrates an operating environment 200 in accordance with one or more embodiments. To better understand the principles of the present disclosure and solely for explanation, continuing reference will be made to an individual 226 who is passing through United States of America (U.S.) Customs, e.g., Jan Jorgenson. With continued reference also to FIG. 1, systems, such as system 202, are further described. Although a dashed boundary 228 is included to aid in understanding, various components within the system 202 can be varied, and other structures can be substituted or added. Furthermore, as some of the components are mobile or serve other purposes (e.g., embodied as an application supported by computer implementable instructions), components can join/leave the system 202 based on use. The components remaining in the system can be dynamically reconfigured based on the resources that remain in the system.

In this scenario, for the purpose of explanation only, an individual 226 is being screened as part of his vacation to the U.S. The individual 226 will also be screened as part of exiting as later described, illustrated as 230. For this example, the individual (Jan) is in-scope; he will be screened according to predetermined processes. As illustrated, the individual 226 inputs biographic information to, for example, a collection device 232 configured to collect biographic and/or biometric information associated with the individual 226. Example collection devices 232 include, but are not limited to, kiosks, mobile telephones/smartphones, laptops, computing systems (operated by one or more of airlines, travel facilities, governmental entities, law enforcement), a wearable computing system, an access control device, combinations thereof, and so on.

An example of collection devices 232 acting in combination is an individual 230 collecting some information on his/her smart phone before wirelessly communicating it to a kiosk to complete information entry. In another example, biographic, biometric, and/or travel information is communicated from a smart phone by optically scanning a barcode, that is shown on an included display of the smart phone and which encodes the information, with a scanner on the collection device 232. In other instances, the information is communicated to a central resource 234 of system 202; scanning or wireless communication between a smart phone and a kiosk is used, for example, to access the information in memory.

Additionally, the collection device 232 can collect travel information, e.g., flight number, airline, visa number, seat assignment, meal preference, payment method, traveler information (frequent flyer number), and so forth. For example, the collection device 232 collects travel information from a reservation system 104 of an airline, responsive to a person 226 scanning his/her boarding pass with an optical scanner like a barcode reader.

In some embodiments, a mobile device that functions as a collection device 232 and/or the central resource 234 coordinates or marries information provided by another system with information provided by the individual 226, e.g., input directly by the person or by the individual scanning his/her boarding pass, passport, driver's license, credit card, smart phone, debit card, visa, travel document, or a combination thereof. For example, the central resource 234 combines information provided by the individual 226 with historic information, e.g., biographic/biometric information from a previous trip or enrollment. The information can be included in a record 212 associated with a unique identifier, e.g., a record including entry information as described above.

As illustrated, the collection device 232 includes a processor 236 and memory 238. An image capture device 240 (e.g., a camera) and communication unit 242 are also included. Although a single processor 236 and memory 238 are shown, multiple processors and memory can be included. A wide variety of types and combinations of memory may be employed, such as random access memory (RAM), hard disk memory, removable medium memory, and other types of computer-readable media.

As further illustrated, the collection device 232 includes an information module 244. The information module 244 is representative of functionality to collect information.

Although operation of the information module 244 can be accomplished by hardware, as illustrated the information module 244 comprises a program of instructions that collect or otherwise facilitate the collection of information. Information can be collected directly, such as by typing in information, scanning a fingerprint, iris, or capturing an image of a person's face.

The information module 244 can collect information indirectly. For example, a user may scan a passport 246 or a travel document 248. In the foregoing example, the information module 244 collects the information that is coded directly in, for example, a machine readable unique identifier, or a bar code 250 directs the collection device 232 to a source of the information. In other instances, information is indirectly input by typing a unique identifier in a text box so the system 202 accesses a record in the database 214 on the central resource 234 and/or on another system, e.g., a reservation system 104 of a common carrier reservation or a check-in system/collection device 110. For example, the information module 244 uses a machine-readable scanner to access information in memory 216 on the central resource 234.

Scanning can comprise optical scanning (e.g., machine readable optical scanning, such as a barcode output on a display of a smart phone), magnetic scanning (e.g., reading a magnetic strip on a credit or other card), scanning a radio frequency identification (RFID) tag or chip, ultrasonic scanning, capacitance scanning (active or passive, near-infrared scanning, a combination thereof, or the like).

Example information includes biographic information, biometric information, travel information, and so forth. For ease of understanding, the information module 244 is illustrated as containing a biometric module 252 and a biographic module 254 that, respectively, are capable of collecting biometric information and biographic information for an individual 226. The information module 244 can be constructed to support one or more graphical user interfaces (GUIs) 256 that are output on a display 258 included in the collection device 232 for accepting user input. For example, the information module 244 includes an application program interface (API) that allows it to collect an image captured by the image capture device 240, e.g. a digital image camera. Example images include but are not limited to an image of a person's face, an iris image, an image of a fingerprint or multiple fingerprints.

In further examples, the information module 244 collects information from one or more other devices that directly or indirectly collect information. As illustrated, the information module 244 is configured to support an optical scanner 260 by collecting information encoded into for example a barcode or by accessing a resource to collect information and/or to direct information for collection by another resource, e.g., memory 216. An example of the foregoing is the information module 244 accessing a remote database, e.g., a reservation database, to obtain biographic information associated with a barcode in a passport 246.

In embodiments the information module 244 is embodied as a program of instructions, e.g., an application that is stored in memory until accessed, e.g., launched. For example, the instructions embodying the information module 244 are included in one or more computer-readable storage media, such as tangible media, that store the instructions in a non-transitory manner. In embodiments in which the information module 244 interacts with physical and/or software components, the information module 244 is configured to interact via an API to access the information.

In examples, the biographic module 254 accepts information input directly to the collection device 232, e.g., user inputs, such as keyboards, touch screen displays, mice, gesture detectors, microphones enabled with voice recognition software, and the like that accept biographic and/or biometric information. In this instance, the information module 244 generates a graphical user interface (GUI) 256, supported by a program of instructions, output on a display 258 that permit an individual 226, e.g., the user, to enter information.

The information module 244 can include validating functionality, e.g., a script or program of instructions that validates the information, that is operable to implement rules for validating information, such as in response to entering information via a keyboard. Example information includes biographic, travel, and/or biometric information. In embodiments such as this, the validating function can be embodied as an algorithm that weighs the information to determine its validity. For example, instructions that enable the information module 244 to implement an algorithm that compares a name entered via a keyboard with that maintained in memory, e.g., memory, for a corresponding passport 246.

The validation rules can be used to check for inconsistencies, errors, omissions in names, addresses, flight numbers, a description of goods/articles is accurate/falls into a pre-established category, responses to yes/no questions, and so on. Examples of validation rules include but are not limited to, a specified number of digits, a number pattern, and the like. The information module 244 can validate biometric information by for example checking to ensure a picture of the individual's face is present, a fingerprint has been captured, an iris scan is collected, and so forth.

The information module 244 can implement biometric validation in a similar manner. For instance, the biometric module 252 is enabled with code that checks a fingerprint to determine that all or enough of a fingerprint is present to permit matching/identification based on a captured fingerprint. In the previous example, the computer code performing the validation can analyze the fingerprint using one of several classification systems, including but not limited to, an algorithm based on the Vucetich system, the Roscher system, the Juan Vucetich system, or the Henry System. In embodiments such as these, the biometric module implements an algorithm that assesses the quality of the biometric information. For example, the biometric module includes a quality algorithm to determine if a facial image is of sufficient quality to be used for matching. In some instances, the biometric module may select from multiple images to determine which, if any, is of sufficient quality to be used.

In embodiments, validation can be triggered by an event. Example events include entering text, checking a box or button, browsing to a new page or display, selecting enter or save, responsive to an event (e.g., a user entering a "mantrap"), and so on.

The information module 244 or a validation module, if used, includes validation rules for different countries, languages, information text boxes, and so on. Example validation rules can include rules for names, addresses, dates, passport numbers, flight numbers, a description of goods, personal characteristics, responses to yes/no questions, biometric information inputs, and combinations thereof. Examples of validation rules include but are not limited to, a specified number of digits, a number pattern, and the like. The validation module or information module 244, if it is performing this role, can include a result table (stored in memory) that is configured to store validation records. Validation records in embodiments include data associated validation errors, successes, information correction (e.g., correction of a city name), and the like for an event that triggers validation. Thus, as text is entered, the data validation logic can validate each entered character for an event, e.g., key press, submitting or storing information. The system 202 (e.g., collection device 232 and/or central resource 234) can maintain the validation records for a predetermined period of time, until occurrence of an event, and the like events. It will be appreciated that this information in the validation record may be included in a name record and/or an indication (such as a score) can be included. In the latter situation, a score may indicate the person or persons are attempting to provide false or misleading information. What threshold score is to be achieved to pass validation can be changed manually, e.g., by a system supervisor, or dynamically based on a variety of factors, including but not limited to, location, other users' errors, and so forth.

Although validation has been described in combination with the information module 244 on the collection device 232, in other embodiments the central resource 234 performs this functionality, or a more robust/different form of validation/checking or it can be performed in a distributive manner. In further embodiments, validation is performed by a dedicated module on the collection device 232. In the previous example, an API is used to allow the information and verification modules to interact.

The code included in the information module 244 or the validation module, if one is included, can be configured to perform additional functions, such as translating text. For example, the validation module contains validation rules that check whether a user's response is in a language that is not officially accepted by the system 202. The validation module 202 may do this based on a user input, e.g., a language selection, existence of a particular Unicode character in the information, comparing information to dictionaries, or the like.

As illustrated, the collection device 232 includes an image capture device, e.g., a camera, although other devices, scanners (e.g., an iris scanner), detectors can be included with or used in place of a camera. The image capture device 240 is operable to capture biometric information. For example, a user interacts with a camera in a kiosk to capture an image of his/her face for inclusion with his/her biographical information. Other biometric information includes, for example, a fingerprint image, an iris scan, a body scan and/or actions associated with behavioral traits, voice pattern, walking gait, and other biologically identifiable traits. In the picture situation, the image is embodied in a file for inclusion in custom information. The image may be contained in a variety of file formats including, but not limited to, a jpeg file, a tiff file, a gif file, a pdf file, and so forth. As will be discussed in greater detail below, image capture can include capturing a video or multiple images and down-selecting a particular image using an algorithm to select an image that meets or exceeds a quality threshold, e.g., is suitable for biometric identification.

As illustrated, the collection device 232 includes a communication unit 242. The communication unit represents hardware and/or software (e.g., firmware) for communicating with other devices/components in the system, external resources, such as other systems, and the like. The communication module can implement a variety of communication technologies including, but not limited to, wired, wireless communications and combinations thereof. Wired embodiments include communication systems that implement Internet protocols, e.g., transmission control protocol (TCP) over internet protocol (IP), fixed or hardwired telephony communications.

Wireless communications include but are not limited to BLUETOOTH (Bluetooth SIG, Kirkland, Wash.), by an 802.11 compliant communication link implementing a receiver/transmitter, a cellular compliant transceiver that is compliant with a commercial cellular standard (4G, 4G LTE, 3G, 5G). An example 802.11 compliant system is a system compliant with 802.11n, 802.11ac, 802.11ad, 802.11ah, 802.11aj, 802.11ax, and the like wireless local area network standards promulgated by the Institute of Electrical and Electronics Engineers (IEEE), New York, N.Y.

At least some of the information can be obtained from one or more other systems. For example, upon scanning a travel ticket or other travel document, the system obtains information from a computing system for a common carrier, encoded into the ticket (e.g., encoded in a barcode), from the individual 226 himself/herself or from a representative of the individual 226. The information or a portion thereof may be retrieved responsive to the scanning or other request, the information or a portion thereof can be already accessible, such as via a network connection, from remote memory (e.g., central data storage). For instance, responsive to scanning a bar code output on a smart phone, an application on the smart phone can cause it to provide information stored in local memory or otherwise accessible to the smart phone, e.g., user profile information. The user can permit this to happen by clicking on an "I accept" icon output on a display.

At least a portion of this information (biographic, biometric, travel) is historic information in embodiments in accordance with this disclosure. Historic information comprises information that is sufficiently prior in time to a current transaction or transaction so as to indicate it has particular importance or relevance. For example, historic information has been verified or is deemed accurate due to the passage of time. Confirming a person's information matches that used five years prior (such as without incident) can be more probative than the same information used within the previous month. Thus, the system, e.g., the central resource 234, in making a determination can weigh historic information more heavily than that of recent information.

One example of another system, from which the system 202 can obtain information is described in U.S. patent application Ser. No. 14/487,598, entitled "Mobile Application," filed on Sep. 16, 2014 which is assigned to the Government of the United States of America as represented by the Secretary of the Department of Homeland Security. Paragraphs [0020]-[0097] and the drawing FIGS. 1, 2A, and 2B of the foregoing application are incorporated herein, by this reference, for their useful background information on such a system.

In other instances, the information or at least a portion of the information is already on the system 202, e.g., memory. For example, biographic information, including travel information for storage includes in the central resource 234 prior to the individual 226 scanning his/her passport 246, travel ticket, license, credit or debit card, or the like token that identifies the individual 226. The system 202 may have already conducted a review, or an initial review, of at least some of the information for the individual 226. For example, the system 202, e.g., the central resource 234, initially reviews the information or a portion thereof to determine whether an individual 226 is permitted to fly into the country, has a criminal past or has a pending charge, should be subject to particular procedures (e.g., additional screening, routine screening, minimal screening, screen associated physical objects, asked particular questions). The system's review can be conducted based on a variety of information in the biographic or travel information.

An initial review of the information is conducted contemporaneously with a determination or initial determination that the individual 226 is in-scope in embodiments. For example, the central resource 234, in addition to determining a person is in-scope, determines what procedures to implement for the person based on biographic or travel information. In another example, the central resource 234 routes the individual 226 for minimal screening as the determination and initial review indicate the person is out of scope and unlikely to pose a risk.

In other instances, the system 202 routes the individual 226 based on the information. A person who is likely to speak a particular language, e.g., German, can be routed to a customs official with a corresponding language ability. For example, the matching module 124 determines that an individual 226 likely speaks German and routes him/her to a customs officer identified in a skills database as having this capability. Other examples include, but are not limited to, routing individuals 226 based on a cultural sensitivity, e.g., a female is routed to a female customs officer, behaviors, and so on. The foregoing routing can be based on a presumed or expressed preferences.

The system can be configured to impact a variety of information-based factors, and situational factors can be implemented when determining where, when, how, or to what extent or level of rigor screening is to occur. For example, an individual 226 with an earlier departure time is routed to a station where the wait time is lower in comparison to a person who has a later departure time. In another instance, a person is routed to aid law enforcement activities. For example, individuals 226 in a traveling party are routed to different stations so officials can interact with one person out of the immediate presence of one or more other members of the party. The system can be configured so such decisions appear to be random, e.g., people in other travel parties adjacent the travel party of interest are directed to different stations to minimize the likelihood that persons in the party of interest detect the underlying goal.

Further description of how the system can conduct an initial review will be described in further detail below. In some instances, an initial review is performed substantially similar to that of a review performed upon exit or entrance. It should be understood that an initial review can be a review of a subset of the data used in a review, be a review of information different from that examined in a review, or be of similar scope to that of a review. The system can perform the review using a lookup table, an information-checking algorithm, or the like to check whether biographical information, including travel information, meets one or more predefined criteria. For example, the system is configured to conduct an initial review of a name provided by an individual 226 attempting to enter a country. In the preceding instance, the system may check a database of names to determine whether the name is in the database, is an alias of a name, or is a colorable variation of a name. The system can be programmed to employ an algorithm that checks whether the name being reviewed is a misspelling, a nickname or variation of a name in the database (e.g., the name "Jon" for "John"). In these instances, the system is programmed with one or more algorithms such as a text parser that parses, or breaks up "words" into components for analysis, a dictionary of names (including variations and/or common misspellings), a phonetic comparison algorithm, and the like.

The system 202 can be configured to access a variety of information sources in response to an initial review. Information from additional sources can be used as the basis of the review. For example, responsive to a determination that the individual 226 has a criminal history, the system accesses a third-party database, e.g., state criminal records, to determine whether to implement additional precautions or procedures, e.g., additional or more intrusive screening, e.g., heighten screening of physical objects associated with the individual 226. What procedures or combinations of procedures are to be used may be stored in a database that dynamically selects based on available information, e.g., in a name record, other databases, accessible from a third party. In the foregoing instance, the system in response to the review obtains additional information and bases its review at least partially on that information.

Returning once again to operation of the collection device 232 in connection with the system, the collection device 232 can store the information, in response to obtaining information from a token, e.g., an identification token such as a passport 246. The system can store the information locally, such as in local memory 238, communicate the information or a portion thereof to the central resource 234, store part locally and part on the central resource 234 and combinations thereof. In embodiments, the information is temporarily stored in local memory before transfer to the central resource 234 at a predetermined time or on an occurrence of an event, e.g., an individual 226 enters customs, the person is "cleared", the person's plane departs, a period of low processing and/or communication demand, and so on.

The system's decisions on how, when, and what information is to be communicated, such as by using communication unit 242, can be based on a variety of factors. For example, the system, including the collection device 232, communicates some information (e.g., biograph information) first while biometric information is communicated later as it typically is of a larger size than biographic data. For example, while a hash of a facial image (facial image hash) is communicated in real time or near real time, an underlying image may be communicated at night or during a period of low processing and/or communication demand. What information, when information is communicated, and how it is communicated can be determined based on other rationales. For example, information is communicated to permit distributive computing, allow for load balancing, and so on. In some instances, information is communicated to the central resource 234 for storage and/or processing. In other instances, data is held in local memory associated with a facility, e.g., an airport, until requested by, for example, the central resource 234.

In additional embodiments, other systems preprocess the information or a portion thereof. For example, an airline check-in system pre-processes, such as by prepopulating information, information before communicating it to the central resource 234.

In embodiments, the collection device 232 includes or is associated with a physical access control device for controlling physical access or passage by individuals 226. For instance a physical access control device meters access into or out of a sterile environment, such as customs inspection area. Example access devices include "man-traps," gates or "electronic gates," "vestibules," and the like. For instance, the collection device 232 is an electronic gate including one or more of a camera to capture a facial image, a scanner (e.g., an image scanner) to capture fingerprints, a magnetic or radio frequency identification (RFID) scanner to read information encoded in a magnetic or RFID chip associated with a document, e.g., a passport 246. The access control device can be physically coupled with the collection device 232, such as in a single unit, or it can be communicatively coupled either directly via a wireless communication connection or via a connection with the central resource 234 that is in communication with a device that functions as a collection device 232.

In embodiments, where a smart phone or other mobile device is configured to function as, or function at least partially as, a collection device 232, the smart phone can be associated with the access control device in a variety of ways. For example, a smart phone and access control device are wirelessly coupled by a local area network, such as by BLUETOOTH, an IEEE 802.11 compliant receiver/transmitter, a cellular compliant transceiver compliant with a commercial cellular standard.

In other embodiments, a smart phone or other mobile device is associated with the access control device via communication occurring through the central resource 234. In other embodiments, a mobile device is associated with an access control device because the smart phone outputs a unique identifier, such as an optically recognizable identifier used to trigger an event. Examples of the foregoing include, but are not limited to, machine readable identifiers, like a barcode, SIM cards, etc.

In another example, after inputting relevant information (e.g., biographic/biometric information) via a smart phone, it receives a bar code usable to open an electronic gate so as to exit/enter an area. An example of the foregoing is to allow a user to exit a mantrap by displaying a bar code to an optical scanner to support this functionality. In the previous example, a program or application on the smart phone is constructed to permit users to interact with the access control device. For example, responsive to successfully concluding screening by a smart phone the central resource 234 instructs the access control device to open. As should be apparent, a smart phone or other mobile computing device can communicate with the central resource 234 which in turn communicates with the access control device. In still further embodiments, the smart phone (including a supporting application) communicates with the central resource 234 and receives a unique identifier that is usable by the collection device 232 to access information.

With continued reference to FIG. 2, the central resource 234 is illustrative of functionality to support one or more collection devices 232, and so on in the system. The central resource 234 can do this by storing, obtaining/validating information, coordinating information, matching records, and combinations thereof. In embodiments, the central resource 234 includes one or more computing systems or servers constructed to provide central resource 234 functionality. In implementations where multiple computing resources, e.g., computing are implemented, individual ones may operate in a redundant fashion, perform load balancing, and so forth to provide substantially seamless support. Redundant support and/or load balancing between multiple computing resources can be handled in a variety of ways. In some instances, different systems can perform different tasks or portions of tasks, while other respective central resources 234 accept/hand-off tasks as the individual computing systems become busy/become less busy. In additional embodiments, components or functions performed by the central resource 234 may be performed or partially by a resource located in a local environment, such as at an airport, port, customs facility, port of entry, and so forth.

The collection device 232 and central resource 234 can communicate in a web-enabled manner. For example, data communication is performed using hypertext transfer protocol (HTTP) or hypertext transfer protocol secure or hypertext secure sockets (both are referenced as HTTPS). In an additional implementation, extensible hypertext markup language (XHTML) is used to communicate or present information. The collection device 232 and central authority may implement other standards, such as extensible markup language (xml), in conjunction with or separate from public key encryption (PKI) used to encrypt the data for communication or storage. In embodiments, the collection device 232 and central resource 234 communicate in a client-host arrangement.

With reference to FIG. 2, as illustrated the central resource 234 functions as a hub in a hub and spoke configuration with collection devices 232, other systems (e.g., a reservation system 104 or a check-in system/collection device 110 of a common carrier), computer systems operated by governments or law enforcement, quasi-government organizations (National Center for Missing and Exploited Children), and so forth. As should be apparent, the central resource 234 can function in a variety of ways depending on the corresponding system/device with which it is interacting or receiving communication. The central resource 234, for instance, is only configured to receive information from common carrier systems, while it handles different tasks for collection devices 232, "internal resources," and so on.

As illustrated, the processor 210 for the central resource 234 includes a matching module 124. The matching module 124 represents functionality to accept information, generate records, match entry/exit records for individuals 226, verify information, and so forth. The matching module 124 can be comprised of computer executable instructions, e.g., a program or script, that are constructed to enable the processor to perform the described task.

In an embodiment, matching module 124 receives information from collection devices 232 and other systems. In an embodiment, the central resource 234 saves biographic, biometric, and/or travel information in a record for an individual 226. When the system encounters an individual 226 for whom no record exists, such as when the individual 226 has not previously entered the country, the system creates a new record. In embodiments, the system generates a new record each time a person enters the country. In an embodiment, the biographic and the biometric information are associated with one another in a record. In an embodiment, the matching module facilitates rapid search by separating and/or arranging the information to promote rapid searching based on a particular criterion or criteria or a design preference. For example, a record, to which the matching module 124 stores the information for an individual 226, includes a link that directs access to the biometric information stored in a corresponding biometric information record.

As should be appreciated, a collection device 232 may include a matching module 124 to function in a manner as that described in conjunction with the central resource 234. It should also be apparent that one or more of the central resource 234, a local computing resource (e.g., one or more servers co-located with collection devices 232), and the collection devices 232 can include a matching module 124 that performs the same or similar functions to the matching module 124. In some embodiments, the local computing resource and/or collection device 232 can perform match or a portion thereof, such as preprocessing information to be used in matching.

In some instances, a subset of the biometric information is retained in the record, e.g., a part of the biographic information or a computational result that is indicative of the biometric information, e.g., a biometric signature, a hash of the biometric information. In the foregoing example, the biometric module and/or the matching module calculates the biometric signature based on collected biometric information, e.g., facial dimensions. A biometric signature can be used to promote rapid biometric matching such as for routine identification. In embodiments involving multiple records, they can be linked via a unique identifier, such as a passport number, a session identifier, an assigned number, or the like.

For example, the database 214 and records stored therein are structured to facilitate searching based on name, identifiable biographic information (e.g., eye color, tattoo description). The foregoing can be done by segregating some information in a record (e.g., in a name record or entry record) from other information (e.g., separating biometric information, such as the majority of an individual's biometric information, from biographic information), duplicating some information in a table (e.g., a lookup table), indexing information, and so on to increase efficiency relative to a database without such a feature. Biometric information or portions thereof can be handled in similar manners. In embodiments, information associated with a particular trait or traits, e.g., eye spacing, is used to aid in rapid general identification or eliminating possible matches, while other identification techniques (other traits, combinations of traits, behaviors, etc.) are used to promote accurate identification by confirming an individual's identity.

In embodiments, the approaches, techniques, algorithms, implemented by the matching module 124 are tailored based on database structure and/or operating parameters. For example, the algorithm is configured to match an individual 226 leaving with his/her entry record by matching information in a particular order. For instance, the matching module 124 implements an algorithm that matches entry records based on the country that issued the passport 246 in order to reduce the records to be searched before searching for a particular passport number. In another instance, the algorithm uses a unique identifier (e.g., a machine readable bar code on a travel document) that points to a record to which a match is to be made. In the previous example, the matching module 124 attempts to make a match, e.g., match identities, based on the unique identifier before reviewing other records and/or lists or a database of individuals 226 for which alternate procedures are to be employed.

The matching module 124 can be configured to operate in a variety of modes that are accessed responsive to user input, e.g., a system manager configures the system to implement a higher accuracy level in comparison to standard operation or dynamically based on a variety of information factors. The central resource 234, for example, supports a GUI that is configured to accept user input to increase the matching module's certainty level, such as when security is higher than normal. In this case, the matching module 124 matches additional information to increase certainty. In other embodiments, different information or additional information can be used to increase certainty. For example, instead of performing a "standard" biometric match, that yields ninety-two percent certainty, the matching module performs a more in-depth review that increases accuracy to ninety-eight percent by matching more factors, matching to a greater degree of accuracy, combinations thereof and so forth.

In other embodiments, the matching module 124 dynamically alters how and/or what algorithm is used to confirm a match. For example, if it appears based on biographic information an individual 226 is to be the subject of additional procedures, e.g., additional safety screening, the algorithm implements additional checks to make sure the traveler is an individual 226 for whom additional checks are appropriate. In additional embodiments, the matching module is configured to alter how, what, and/or to what extent biometric information is used to identify an individual 226. For example, an algorithm used by the central resource 234 applies a higher facial recognition standard to an individual 226 associated with poor fingerprint image, such as a brick layer.

Example heightened checks comprise additional information matching, the use of different or more rigorously applied biometric identification algorithms (in comparison to that commonly implemented by the central resource 234). For example, while the matching module 124 implements a target matching algorithm to identify an individual 226 who is not to enter the country, an identification algorithm is used to verify the individual 226 is indeed the individual 226 who is barred from the country. In other examples, the matching module dynamically lowers accuracy to a predetermined acceptable level in order to increase the number of individuals 226 that can be screened.

In some instances, the matching module 124 coordinates information for a current instance with historical information. In some instances current information is married with historical information. In other instances, the matching module 124 uses historical information as a check or validation on current information. The matching module 124 can perform this check by comparing a particular piece of information (e.g., a unique identifier such as a passport number) or based on a combination of information. An example of the latter situation is combining a first or given name, a last or surname, with a date of birth, and/or other biographic information to determine what tasks to perform, e.g., obtain additional information, impose predefined procedures, deny access, and so on. The matching module 124 in addition to or in place of the foregoing can also check the data to determine it is valid, e.g., a birthdate is composed of a month, day, year in that order.

Other information can be stored in conjunction with at least some of the information (biographic, biometric, travel). For instance, the matching module 124 includes a unique identifier (e.g., a record identifier, a session identifier) with the information. The matching module can include other information in the record as well. For example, the matching module includes one or more of a time stamp, a software version, algorithm configuration, and the like with the information comprising the record. This other information can be included directly or used as metadata to biographic, biometric, or travel information.

Memory 216 can be used to store information in a variety of ways or formats. For example, information for an individual 226 whether obtained from a collection device 232, received in a manifest, or obtained from another system, can be stored in a record that is generated when an individual 226 enters or attempts to enter a country. In other examples, information is stored in a name record that contains information for (potentially) multiple instances. A name record for example may contain information for multiple visits, e.g., multiple entry/exits for a particular individual 226 in addition to containing biographic information for the individual 226. Memory 124 can house other databases, e.g., a manifest database configured to contain manifests from common carriers. Memory 216 can house or contain other databases, tables (lookup tables) and so forth. For example, information for people meeting pre-specified criterion can be housed in a separate database or lookup table.

Other example databases include a procedure database that details procedures, prompts, questions, additional information, and so on to be used. For example, the central resource 234 includes an information database that details common information associated with a geographical area (e.g., a departure city, country, state). The central resource 234 may use this database to formulate questions designed to test whether an individual 226 is aware of information that is commonly known for an area.

In implementations, the central resource 234 maintains information associated with certain characteristics in a database for comparison against information for individuals 226. An example of the foregoing is the matching module, as part of receiving and/or storing information, uses a lookup table to determine whether information for an individual 226 matches or at least partially matches that contained in the table. For example, the matching module implements a script or other logic to determine whether the name of an individual is that of someone who is not permitted to use a particular form of transportation. In this example, not only may the lookup table include information persons meeting a preselected criterion, but it can include colorable variations of the information. Example variations include alternative spellings, misspellings, aliases, date ranges such as for birthdates, variations in physical descriptors (e.g., brown for hazel eye color), combinations thereof, and so forth. While the forgoing checking has been described with respect to record creation a substantially similar process may be used when matching information for a person leaving with that of an entry record. Moreover, the matching module 124 can implement a matching algorithm, e.g., a graphical based algorithm that accounts for variation in individual pieces of information.

Moreover, while the preceding processes are described in conjunction with storing information, in some instances information is stored in a record and then compared to determine whether a match exists. For example, rather than delaying overall productivity, a server functioning as the central resources 234 temporarily stores information into the database and then review it rather than checking and storing the information in series.

In embodiments, the central resource 234, e.g., the matching module 124, validates information to ensure it is properly formatted (e.g., the information is valid), conducts an initial review of the information, or a combination thereof. For example, the matching module 124 checks the information to determine whether it duplicates previously submitted information. The foregoing can be done by querying the database based on one or more portions of the information. For example, it may check a passport number against those in the system to identify someone attempting to use an altered passport, i.e., the passport 246 has a valid passport number but the contained information is not accurate to the information upon which the passport 246 was issued. Although validation is described in conjunction with the matching module 124 in other instances the validation and/or initial review functionality is embodied as a validation module. Such a validation module is representative of functionality to validate information and supported by a program of instructions, e.g., implementation of a set of validation rules by the matching module. For instance the central resource 234 includes a validation script that executes to perform validation logic. Validation or initial review can be performed in a distributed manner, e.g., a collection device 232 performs a portion of the task and the central resource 234 performs other portions or confirms the validation or review.

The central resource 234 and matching module 124 can be configured to perform additional tasks. For example, periodically or upon request the central resource 234 is configured to check whether individuals 226 corresponding to records in a database meet a predetermined criterion, e.g., overstayed his/her visa. In instances like this, the matching module 124 or another component of the central resource 234 checks records containing information meeting the criterion, e.g., "overstay." In response, the central resource 234 creates or updates a database with information from records that meet the criteria and/or creates/updates a table or other data structure with links to records that meet the criterion. The central resource 234 can add information to the record to indicate the record meets the criteria. For example, in addition to populating an overstay database with information for people who overstayed his/her visa the matching module may flag the records by including information in the record that shows the person has overstayed.

With continued reference to FIG. 2, having described how the system 202 and its components function, further description is now provided of an exit process. In an exit process, the matching module 124 may make a determination that an individual 226 matches a particular record, e.g., a record with information for the person's entry. Similar to an entry process, the matching module checks information for an individual 226 against a "list," registry, table, or database as part of the matching process to determine if the individual 226 is allowed to proceed, e.g., exit, and/or under what procedures or conditions are to be applied. While information for a person exiting can be compared to information used during entry, in other instances the information is compared to different information. An example of the foregoing is comparing information (e.g., travel, biographic, biometric, a unique identifier) for an individual 226 with that of information of individuals 226 who meet a predetermined criterion, e.g., overstayed a visa or permit.

Solely for the purposes of example, clarity, and discussion a computer system, such as a custom official's work station 262 is illustrated to further describe the system 202, method, techniques, and approaches that can be implemented in accordance with the present disclosure. It should be apparent that a collection device 232 or a combination of collection devices 232 can be configured to provide the functionality. Like the collection device 232, the workstation can be associated with an access control device, e.g., an electronic vestibule.

In the current example, an individual 226, who wishes to depart the country, is screened as part of an out-processing procedure. Among the tasks in such a procedure, the system 202 checks that the individual 226 is not flagged (i.e., does not meet some predetermined criterion, e.g., is wanted, not permitted to fly, has overstayed, or is not permitted to leave the country) and matches the individual 226 and his/her information to an existing record, e.g., a record populated with entry information, in order to complete the record and/or to generate an exit record, e.g., a name record with exit information, that is associated with the entry record. Entry and exit records can be related by a unique identifier, e.g., a record number, a session number, a bar code, and combinations thereof. As illustrated, the individual 226 has one or more tokens (e.g., travel document 248 such as a travel ticket or a boarding ticket, passport 246) that collectively or individually are associated with the record 212.

The individual 226 may provide identification and travel information directly or indirectly, e.g., to the workstation or to the official for entry. The traveler directly provides information, for example, by typing it into the system 202 or by presenting their face for capture of an iris scan or picture. Information about the traveler is indirectly provided by, for example, a customs official inputting information on the individual's behalf, the individual 226 scanning a bar code, or the like. For example, upon reaching a kiosk, an individual 226 scans his travel document 248 such as a ticket and/or passport 246 to provide biographic, biometric, and/or travel information when exiting the country. Using the unique identifier and/or information, the system 202 matches the individual/the information for the individual to a record, e.g., a name record with information collected when the person entered the country. The central resource 234 supporting this effort may, for instance, attempt to identify the record based on the unique identifier before attempting and/or confirming the identified record is the correct one based on matching information associated with the exit event and the individual 226 with corresponding information from the entry record. For example, the central resource 234 checks biographic, biometric, travel information in an effort to determine to a predetermined level of certainty that the individual 226 is indeed that reflected in the record.

In some embodiments, confirmation of an individual's identity is performed by displaying an image, such as a picture of a person's face captured upon entry, and permitting a customs official to perform a comparison. In other examples, biometric information, a portion of biometric information captured at entry and exit are compared to determine whether a match exists. As should be apparent, biometric information can comprise a result of biometric information or identification. For example, the central resource 234 uses a biometric signature that is indicative of biometric information to make the determination, e.g., confirm the person exiting is indeed the person referred to in the record.

In an embodiment, biometric identification is performed using biometric information contained in a token. For example, as part of an exit process, the central resource 234 compares biometric information, captured contemporaneously from an individual 226, with that of an entry record and with biometric information from an identity token, e.g., driver's license, passport 246, etc. Biometric information from a passport 246 can be obtained by scanning and analyzing a passport photo, or the information is obtained from a resource maintained by a trusted third party, e.g., Interpol, or the issuing government.

As should be apparent to those of skill in the art, the exact procedure implemented by the central resource 234 can vary based on circumstances, a level of certainty specified or dynamically determined, whether the matching is done for positive identification or targeting and so forth. For example, under routine matching biometric identification may involve matching readily identified characteristics, such as eye color, hair color, height, etc. Under more rigorous examination, other features, measurements of features and so on can be examined.

In examples, the central resource 234, e.g., the matching module 124, issues a unique identifier upon completion of matching information for a person attempting to exit with a record containing entry information. Example unique identifiers include, but are not limited to, an electronic receipt with a bar code or other machine-readable information, a record number to the individual 226, an electronic device associated with the individual 226 (e.g., a smart phone), an account for the individual 226 (e.g., an email account), combinations thereof, and so on. For example, the person's smart phone receives an email with a bar code that when scanned by an optical scanner on an access control device opens the device to permit the individual 226 to pass.

In some embodiments the record number, bar code, etc. can be used by the individual 226 to streamline a subsequent entry event. For example, information from a previous trip is used as the basis of populating information for a subsequent trip. The electronic receipt can be used to prepopulate or furnish biographic and/or biometric information for a subsequent entry event. In this instance, the information is historical information for the subsequent entry event. In this scenario, the use of historical information (used without incident) may cause the system to use different procedures and/or outcomes.

While a variety of devices, components, examples, and scenarios are described, those of skill in the art will appreciate that multiple devices and components can be used and the various tasks handled among the components in a distributive manner, e.g., dividing up tasks, allocating user devices, and the like among the physical computing devices comprising the intermediate. Although one collection device 232 and central resource 234 are illustrated for simplicity, the system can include multiple devices and components with similar functionality or functionality that differs to permits that device/component to perform a particular task or role as described herein. Similarly but one component is illustrated for simplicity. It is to be appreciated for example, multiple components of similar type can be included. For example, a collection device 232 includes an image capture device for fingerprints and another for iris scanning.

It should be noted that while various structures and functions are described with respect to certain members within the environment, the functions and/or structures may be implemented by other members in the environment, e.g., the central resource 234 includes a validation module.

For example, a collection device 232 includes a matching module to identify an individual 226. For example, instead of the central resource 234 matching an individual 226, matching is performed by the collection device 232 and/or a computing system operated in a local environment, e.g., a server at the departure airport. In scenario such as this, the central resource 234 can preposition information in the local environment for use in matching. In some examples, the central resource 234 prepositions biographic and biometric information associated with a traveler who is scheduled to depart the local environment.

Prepositioning can be done at various times, such as on a routine basis (e.g., twenty-four hours ahead), or during period of low processing and/or low communication (e.g., overnight). Prepositioning of information may occur at discreet times. For example, biographic information and a hash of a facial image are sent at one time while an image of the individual 226 is sent at another time. The foregoing may be done based on a variety of factors, such as data size, based on a predictive factor (inclement weather is forecast, and so on).

Processing a match at a local level can occur on a local computing resource or on the collection device 232 itself. For example, as will be described in additional detail below, the prepositioned information may be in a generic form so it is agnostic of one or more of the device, software, algorithm used to capture or process the data, such as a biometric signature, e.g., positions of key facial features. In some examples, the data is agnostic of proprietary algorithms and/or data formats. In other instances, the matching module in the collection device 232 performs biometric matching in a proprietary format using generic data. If for example, the collection device 232 determines a facial hash is corrupt, it may retrieve the underlying facial image from a local server or the central resource 234 and apply its algorithm to the historic image in order to attempt to make a match with an image captured contemporaneously from an individual 226 being screened.

The network 264 illustrated in FIG. 2, and in other locations throughout this disclosure, can comprise any suitable type of network such as the Internet or a wide variety of other types of networks and combinations thereof. For example, the network 264 may include a wide area network (WAN), a local area network (LAN), a wireless network, an intranet, the Internet, a combination thereof, and so on. Further, although a single network is shown, the network 106 may be configured to include multiple networks.

Computer storage media and/or memory includes volatile and non-volatile, removable and non-removable media and memory implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a mobile device, computer, server, and so forth. For example, instructions embodying an application or program are included in one or more computer-readable storage media, such as tangible media, that store the instructions in a non-transitory manner.

Having considered an example operating environment, consider now further discussion of example devices, systems, operations, and data flows that provide a framework in accordance with one or more embodiments. The example devices, techniques, approaches, methods, and systems may be used in conjunction with the environment, systems, devices, techniques, and so on described above.

Various techniques are described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media."

Example Methods

The following discussion describes procedures that may be implemented utilizing the previously described systems, techniques, approaches, and devices. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 200 of FIG. 2 and the systems (including the other system of FIG. 1), devices, modules, applications, algorithms, approaches, and techniques described above. While some block/decisions are captioned as "optional", there is to be no negative inference with respect blocks/decisions that are not denominated as "optional", i.e., the blocks/decisions are not "mandatory". In accordance with some embodiments, information is stored in memory (at least temporarily) during performance of the methods for a variety of reasons. Example rationales include, but are not limited to, data processing convenience, communication convenience, permit batch validation/review, records maintenance, and so on, and combinations thereof.

FIG. 3

Figure 3:
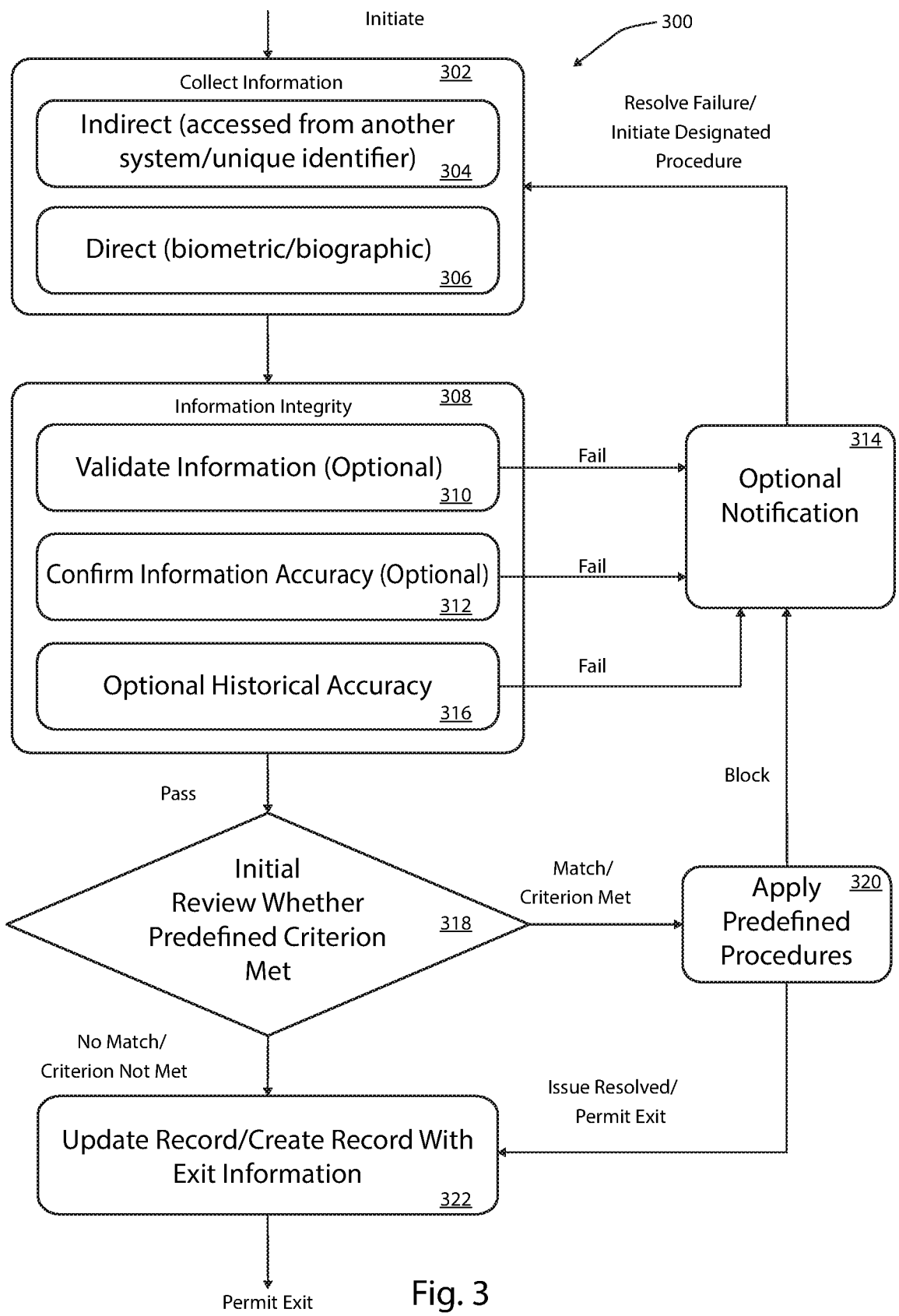
FIG. 3 is a flow diagram that describes steps in a method that can be used for screening individuals in accordance with one or more embodiments.

FIG. 3 is a flow diagram of an information processing method 300 that illustrates steps in a process for obtaining information, checking information integrity, conducting an initial review, storing information, and matching individuals and his/her information to a record. For example, the information processing method 300 is used to determine whether an individual 226 and his/her information meet a predetermined criterion, such as being on a no-entry list. The steps can be implemented in connection with any suitable hardware, software, programs, scripts, firmware or combination thereof. In at least some embodiments, the method can be implemented in software by such as described above.

The information processing method 300 can initiate in a variety of ways. Example initiation events include, but are not limited to, an individual 226 scanning a passport 246 or a travel document 248 such as a boarding ticket, or a person purchasing a travel ticket using a third party system in anticipation of travel. Initiation can involve pre-steps in which information is input or otherwise obtained that indicate an individual 226 is passing through customs. An example initiation event is an individual 226 obtaining a ticket that, if used, would cause him/her to pass through customs. In another instance, initiation occurs in response to the person interacting with a system, such as the system described with reference to FIG. 2.

A step of information collection 302 collects information. Information can be obtained in a variety of ways. Information can be obtained directly from the individual 226 using direct information collection 306 or by using indirect information collection 304 and accessing information from a resource. Information collection 302, in embodiments, is performed responsive to an initiating event such as a person scanning a barcode on his/her passport 246 as part of checking-in for international travel or preparing to go through customs. In the latter instance, the person may interact with a collection device 232 such as a kiosk, or a smart phone with a suitable application on it. Although this can be done at a departure facility, it can be done prior to arrival at departure location by a person providing the information online-, for example, via an Internet-enabled computer system.

Direct information collection 306 can include an individual 226 typing information, scanning his/her iris, face (taking a picture), and so on. As part of traveling internationally, for instance, a person types in information like biographic information and/or travel information to access the system. Biometric information can be collected by performing one or more scans. For example, a person uses a fingerprint "slap" scanner included in a kiosk to provide his/her fingerprints. Similarly, an image capture device (e.g., a camera) can be used to collect biometric information.

In some instances, inputting information such as name and/or travel destination causes the system to access additional information. In some examples, the information is stored in memory on the system, such as in a manifest for a flight. Available information can be prepopulated so the person can avoid entering information that is already in or available to the system.

In other examples, the entry of information causes a central resource 234 to communicate with other systems, e.g., a ship's travel database, to obtain passenger information (an example of indirect information collection 304) which may include biographic information and/or biometric information. In some instances, performing indirect information collection 304 includes converting it from one format to another. An example of this scenario includes converting an image from a postscript file format or portable document format (PDF, Adobe Systems, Inc., San Jose, Calif.) to a JPEG format so the image is understandable by the system or the system implements a common format. Information can be indirectly collected by decoding information that is encoded in machine readable media (e.g., on a magnetic strip) or information encoded in an optically readable identifier.

In some embodiments, information collection 302 is facilitated by an application running on a computer enabled device, e.g., a kiosk, smartphone, and so on. The application in embodiments supports one or more GUIs for collecting information via text boxes, check boxes, radio buttons, calendar selectors, and so forth. The application can collect information from one or more biometric information collection devices. Example biometric information collection devices include, but are not limited to, cameras (visible or infrared), fingerprint scanners, microphones, and iris scanners. The application can be supported by corresponding APIs to permit biometric information collection using hardware and/or software on the device capable of providing this functionality. Biometric information collection can include analysis of collected information. Analysis can include, but is not limited to, a biometric signature that represents or is indicative of at least some of the biometric information, but is of a sufficiently less size to permit effective communication/data processing.

Information processing method 300 includes information integrity checks 308. Example integrity checks include information validation 310, information accuracy confirmation 312, and confirming information for a current event is accurate to historical information if historical information is available for comparison (historical accuracy confirmation 316). These checks can be triggered responsive to an event. For example, a validity check is performed as part of information validation 310 responsive to a person submitting his/her information. An information accuracy confirmation 312 may include checking entered information with information to determine the information is accurate. An example of the foregoing, is the central resource 234 checking an entered given and surname (i.e., identity information) against names in a flight manifest to ensure it matches. A historical accuracy confirmation 316 can compare currently entered information with information that is of a sufficient difference in time to indicate it is likely accurate. These information integrity checks 308 can be performed as a matter of routine or upon an event such as a determination that biographic information does not match to a predetermined level or the biographic information matches or likely matches biographic information meeting a predetermined criterion (e.g., not permitted to fly). Different components can perform the integrity checks. For example, the central resource 234 handles information accuracy confirmation 312 and historical accuracy confirmation 316 checks, while information validation 310 is handled by or at least partially handled by a collection device 232. In performing such accuracy checks, an indication of the outcome can be maintained with the information itself (e.g., a validation id) and/or in a separate data structure for this purpose. In some instances, the central resource 234 maintains a table or separate database of such checks.

Information validation 310 is optional. Information accuracy confirmation 312 is optional. For example, the matching module 124 is configured to validate and/or check the accuracy of information to determine whether data entered in a text box is valid as part of information validation 310 (e.g., numbers are entered into a zip code text box) and is accurate as part of information accuracy confirmation 312 (e.g., five numeric digits correspond to an actual zip code). As illustrated, several outcomes can occur. Example validation accuracy outcomes include valid and/or passed review (an affirmative outcome); not valid and/or did not pass review (a negative outcome, generally illustrated as failed outcome and optional notification 314). An example of the latter situation is a situation in which, for example, a zip code text box is valid (includes numbers), but the numbers do not correspond to a recognized zip code. In scenarios that result in a not valid, no pass, or ambiguous outcome, a record can be generated that notes the determination (non-validation or review failure), stores relevant data, and so forth. An alert, an error message, or a message that facilitates corrective action can be displayed by the output module on the mobile device. An example of validation and accuracy checking for biometric information include, but is not limiting to, checking a collected fingerprint to determine it (to an appropriate predetermined level) corresponds to a valid type of fingerprint, e.g., loop, whorl, or arch, and the fingerprint is sufficiently identifiable so as to permit accurate matching.

Historical accuracy confirmation 316 is an optional historical accuracy check that can be part of information integrity 308. In embodiments in accordance with the present disclosure, the matching module 124 checks information from a current instance (e.g., biographic information entered via a smartphone) with that provided during a previous trip several years prior. Once again, if the information fails this historical accuracy check an optional notification 314 can be provided and appropriate procedures implemented. The specific procedures, like that of the validation and accuracy checks can be detailed in an appropriate data structure. Which procedures are to be implemented can be based on a variety of informational factors as determined by the matching module 124.

Criterion determination 318 is representative of determining whether the information meets one or more predetermined criterion. In doing the foregoing, a system performing this function can implement a series of rules that may be maintained in a rules database or other similar structure.

For example, the criterion determination 318 comprises checking the information to determine if, based on one or more criterion, the individual 226 meets a predefined criterion that, for example, would bar him/her from entering the country, would require implementation of additional procedures, would bar him/her from a particular mode of travel (e.g., air travel), and so forth. In some instances, a predefined procedure 320 is applied; it may entail additional screening, or, e.g., additional questioning, heightened screening, modification of travel arrangement, and combinations thereof. While the predefined criterion may represent a specific criterion or criteria, in other instances a system employing the information processing method 300 dynamically determines whether and what procedures to apply. For example, the matching module 124 implements a dynamic scoring algorithm to determine whether or not to impose the predefined procedure 320 as part of allowing an individual 226 to travel to the destination country or what procedures must be followed once he/she has arrived. A matching module 124 performing this function can implement rules that specify what to do, e.g., "direct traveler/party to secondary screening", while in other examples, the rule may provide instructions to, for example, a customs official to ask one or more specific questions. The instructions embodied by the rule can be communicated or accessed by the customs official from the central resource 234.

Exit recordation 322 is representative of a step or steps of creating an exit record with information for the exit event and/or updating a previously existing record. In the former example, an exit record can be linked to the exiting record via a unique identifier or a link that coordinates the exit record with the previously existing record, e.g., a record that contains entry information. An example of the latter situation is a system performing the method storing exit information with information collected upon entry (e.g., "completing the entry record") or in a record that includes information for multiple trips made by the individual 226 that are associated with the individual's passport number, name, other unique identifier and so on. The previous example presumes for the sake of explanation only that the individual 226 has previously made trips that are encompassed by the record. The generated record can be stored in an appropriate database. Having described example systems and methods, additional features that can be employed to facilitate effective screening and record keeping for a massive scale system are now described.

Information Positioning

FIG. 4

Figure 4:
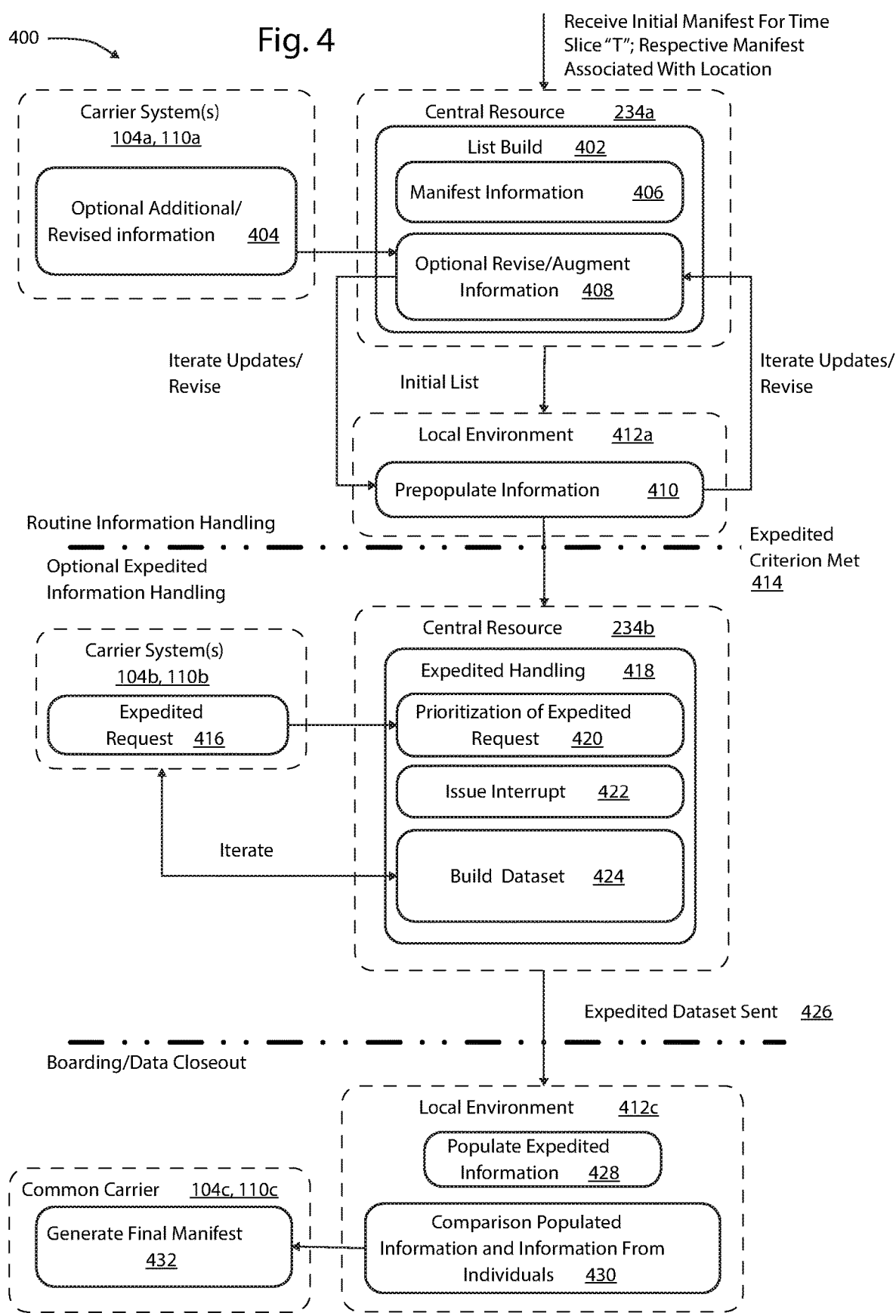
FIG. 4 is a flow diagram that describes steps for managing a massive number of transactions and information in accordance with one or more embodiments.

Referring now to FIG. 4, methods, techniques, and approaches for handling transactions, in particular large numbers of transactions, are described. As illustrated the methods, techniques, and approaches preposition information to avoid central resource 234 processing and communication bottlenecks associated with large-scale systems. These techniques, approaches, and methods can be used to minimize episodic processing and communication demands on a distributed information system, such as a system used in screening individuals 226 entering/exiting a country. While example hardware is illustrated in conjunction with the transaction handling method 400, it is not to be considered as restrictive of the method. Those of skill in the art will appreciate that a variety of hub and spoke information systems can benefit from the principles of the present disclosure. Alphabetical suffix designations are added to example physical devices to distinguish its actions and behaviors at different points in time. Although a single manifest for a particular location is discussed, the principles are applicable to multiple locations and transactions.

In embodiments, information positioning includes routine handling and expedited information handling. Routine handling can include prepositioning information among resources to promote efficient overall system processing or communication in order to avoid bottlenecks. For example, the central resource 234 sends an initial list to a server supporting an airport the night before a flight is scheduled to depart. This may free the central resource 234 to handle requests made on an expedited basis in a more efficient manner, such as during the daytime when it is more likely for changes to occur, e.g., more individuals 226 are making changes to his/her travel plans, or closer to the vehicle's departure time.

Routine handling may be used to position a majority of the overall data that will be used by a system implementing the method over a period of time. A majority, in the previous example, may be substantially all the information (by data size or type, such as biometric data) used by the system in comparison to information that is handled on an expedited basis. Example majority amounts include, but are not limited to seventy percent, greater than seventy percent, eighty percent, greater than eighty percent, ninety percent, greater than ninety percent, ninety-five percent, greater than ninety-five percent, ninety-eight percent, or greater than ninety-eight percent. Handling a majority of the information on a routine basis can increase overall efficiency in comparison to handling interruptions that cause a resource to: interrupt another process, search an index for a database for the location of the information, access the information on the physical data storage device, process the information, and communicate the information. Naturally, it is to be appreciated that a local resource, such as a server or data collection device, can face similar computational and communication challenges handling expedited information in comparison to handling information on a routine basis.

The transaction handling method 400 may commence by receipt of an initial manifest. The manifest can be associated with a particular time slice (e.g., period of time or "T") and a location, e.g., Reagan National Airport. For example, the central resource 234 receives a manifest containing at least some biographic information for passengers on a particular flight, e.g., flight 5400 from Stockholm to Denver.

List build 402 is representative of building a list based at least partially on the initial manifest. For example, the list is based on biographic information, such as name or passport number, contained in an initial manifest for an international flight. At various times before the list is prepositioned, additional or subsequent manifest information may be provided. For example, the central resource 234 receives an initial manifest forty-eight hours prior to expected departure and then receives an updated manifest twenty-four hours prior to the anticipated departure time. In other instances, an initial manifest is sent twenty-four hours prior to expected departure.

List build 402 may include obtaining additional or revised biographic and/or biometric information for individuals 226 represented in the manifest. Optional additional/revised data 404 is illustrated. For example, the central resource 234 accesses databases 214 to obtain additional information beyond that in the manifest. In embodiments, additional information is obtained only for those individuals 226 meeting a particular criterion or criteria. In some embodiments, the transaction handling method 400 includes checking information from the manifest with information maintained by a system performing the method.

For example, the central resource 234 includes an algorithm for checking biographic information against that in a database maintained by the system. An example of the foregoing is an algorithm that is configured to identify inconsistent biographical information and identify and/or classify any differences between information supplied in the initial manifest in comparison to that in memory or that obtained from a third-party resource, e.g., a law enforcement information system.

For example, the central resource 234 implements the algorithm to identify that, in all likelihood, Jan made a typo in his passport number, and his middle initial does not match that maintained in the records. Individually, these discrepancies may not rise to a level that triggers action, but together the differences would be sufficient to present a recommendation that Jan be questioned or a higher level of review be applied when reviewing corresponding biometric information. The algorithm may be programed to weigh the inconsistency or omitted information and provide a corresponding output, e.g., ignore the inconsistency as it is below a threshold, recommend additional questioning, perform heightened biometric screening, refer for secondary screening, and/or communicate with a third party (e.g., law enforcement). The algorithm in the preceding instance can be programmed to do so in an adaptive manner. In this way, common or non-indicative errors can be ignored (as they do not meet or exceed a threshold) while discrepancies that are indicative of unwanted behaviors are identified (meets or exceeds a threshold) and applicable outputs, such as screening recommendations, are made.

A system, including the algorithm performing the method, can be programmed to function dynamically. Examples of dynamic functionality include implementing an algorithm that is capable of adjusting thresholds, identifying macro trends, and/or changing outputs. These techniques can be performed on various levels, e.g., globally, at a particular location, for a mode of transportation (e.g., flight, train travel, ocean voyage), for a particular instance, e.g., a single flight or flights originating from a particular airport country or region.

List build 402 can include determining Jan Jorgenson is in-scope (an example of a predefined criterion) and then obtaining additional information beyond that in the manifest. For illustrative purposes, information from an initial or most recent manifest is illustrated as manifest information 406. It should be evident that building a list can include building it from information in, for example, databases 214 based on information identified in the manifest information 406. This is to say that the list is built from database information based on information from the manifest that indicates, at least partially, what information is to be included in the list. The list can also include information that is generated as part of building a list. Examples include, but are not limited to, an outcome of a decision, a flag or warning, or a recommendation.

The method, upon determining Jan's passport number is included in the manifest information 406, accesses biographic and/or biometric information that is associated with Jan, such as in a name record identified by the passport number in memory 216 when Jan enrolled. In some instances, information retrieval is based on a predetermined criterion, such as Jan being an in-scope individual 226. Other criterion may be used as well. The pre-specified information to be included in the list may be accessed and included in the list. Example information to be included in the list includes, but is not limited to, name, gender, citizenship, and address. Other examples include an image (e.g., a historic image such as captured during enrollment or a previous screening), a hash of facial image, a hash of one or more fingerprints, a signature image, a hash of a signature image, and combinations thereof.

In some instances a common carrier or a local environment, such as an airport authority or port authority, provides information. As illustrated, a variety of information sources can provide additional and/or revised information 404 for inclusion in the list, whether initial or otherwise. Manifests and updates to manifest information may be provided at various predetermined times prior to departure to permit efficient processing and/or communication of at least some of the information in the manifest. Information received by the central resource 234 can include additional and/or revised information 404, including deleted or canceled information to a manifest, such as a most recent manifest. A common carrier may provide information such as this on an ad hoc or on a scheduled basis to account for changes that occur after a manifest is sent, whether an initial, interim, or final manifest. Ad hoc communications can be sent based on dynamic timing. An example of the foregoing is a common carrier responsive to an indication that the system 202 has available processing and/or communication resources.

The manifest information 406 and, as applicable, additional and/or revised data 404 is combined 408 to form an initial list. An initial list is representative of information that is prepopulated 410 to a local environment 412. While an initial list may represent all, substantially all, or a significant portion (e.g., by data size or data type such as biographic information) of the biographic/biometric information that is to be provided to a local environment, in other instances it may be a portion of the information. The initial list may include, for example, some biographic information with all, substantially all, or a significant portion (e.g., by data size) of the biometric information to be provided for matching individuals 226.

In embodiments, the initial list is prepopulated 410 for use in a local environment 412 prior to anticipated usage. For example, the central resource 234 communicates at least some biographic information, biometric information, or combinations thereof to a local environment 412. In the previous example, the local environment can be a computing resource, such as a server that supports, for example, a destination airport. The initial list may include the available biometric information, biographic information, or a combination thereof of information that is available for individuals 226 arriving for a given time period, a particular flight, or the like. For example, the list includes the biometric and relevant biographic information for passengers on a cruise ship. Example biometric information may include one or more of a historic image (e.g., passport photo), biometric facial measurements, an image of a traveler's fingerprint, information from a retina scan, and so on that can be used to bio-identify an individual 226.

In some embodiments, a list may also include instructions for the local resource (e.g., server, collection device 232) to follow. For example, the central resource 234, via the list, can instruct a collection device 232 to implement a higher bio-matching threshold, collect additional biometric information (e.g., capture all finger prints, a palm print), ask for biographic information, require additional screening, check for contraband, and so forth.

In embodiments in accordance with the transaction handling method 400, an initial list may be communicated at various points in time prior to departure. For example, the central resource 234 may send the initial list twenty-four hours prior, approximately twenty-four hours prior, or based on one or more of processing resource or communication link availability at or near a predetermined time. In an additional example, an initial list is processed twenty-four hours prior to departure, but the information is not communicated until twenty hours prior to departure to avoid overwhelming communication links, local resources, based on another priority (e.g., number of individuals 226 on a flight), or combinations thereof.

Prepositioning information, such as by communicating and receiving an initial list to a local environment 412 can result in the information being populated to memory associated with a local environment 412. For instance, information included in the initial list is used to populate a local database that supports a particular airport or collection of airports. This permits the system to position information based on allocable system resources. The foregoing may speed local processing/identification as communication and central processing delays are avoided.

Upon occurrence of a criterion being met 414, the transaction handling method 400 can switch from routine information handling to handling information on an expedited basis. For example, a system performing the method is programmed to handle updates on an expedited basis twenty hours prior to anticipated departure. In other examples, expedited handling is associated with the availability of communication/processing resource or the predicted availability of resources based on historic usage.

Expedited handling may be performed on an ad hoc basis as updates and revised information is supplied to a system performing the transaction handling method 400. In an example, an expedited request is received from a common carrier to add an individual 226 who is not identified in the initial list/information populated to the local environment subsequent to the criterion being met. In this instance, a carrier system sends an expedited request 416 that the central resource 234 perform an expedited handling process 418 so the individual 226 can be screened and travel to the destination.

Responsive to receipt of the expedited request 416, the transaction handling method 400 can prioritize 420 the expedited request 416 among the tasks to be performed. Example tasks are routine information handling, expedited request handling, and so forth. Prioritization can be based on a variety of factors including, but not limited to, departure time, available resources, impact to the individual, impact to common carrier, screening considerations, security factors, time, and combinations thereof.

The transaction handling method 400 optionally can issue an interrupt 422, e.g., a processing interrupt, to dedicate resources to, for example, accessing a name record based on a unique identifier such as a passport number or other biographic information. Issuing the interrupt 422 can include setting a flag to prevent information from a record from being used until the flag is released. The foregoing can be used to prevent reuse of the information for more than one transaction, e.g., reuse of an individual's identity for improper or illegal purposes and promote data integrity.

A dataset including biographic and/or biometric information that is to be used in matching an individual 226 is built in a build dataset process 424. Building a data set may occur similar to assembling information associated with an individual 226 during routine information handling. This can include encrypting and/or packetizing the data for communication.

In some embodiments, the request and/or information to be provided is subject to various processes (e.g., validation, integrity checks) as part of the dataset build process. In some instances, the dataset build process 424 implements additional procedures based on a variety of factors. Example factors include, but are not limited to, type of travel, time to anticipated departure, departure location, destination location, and factors associated with other individuals 226 traveling on the vehicle.

The expedited dataset 426 is communicated. For example, the encrypted and packetized dataset is communicated to the local environment 412c, e.g., a server supporting a departure airport. The communication can occur at a predetermined time, based on the prioritization established when the expedited request was received, as resources are available, on a first-in-first out basis, or based on other factors, such as local resources, security parameters, travel plans of the individual 226 or vehicle on which the individual 226 is to travel, potential disruption to a common carrier, or the like.

The information in the expedited dataset can be used to populate a database in a local environment 412c to provide populated information 428. For example, the information is used by the local server to build a name record that generally mirrors that of the central resource 234. It should be appreciated that the record on the local resource may not include the extent of information that is stored in memory in association with the central resource 234. For example, the central resource 234 may include additional biographic information, like information associated with a previous trip taken by the individual 226.

Comparison 430 is representative of using the populated information (whether receive via routine or expedited handling) to screen individuals 226. For example, biometric information obtained from an individual 226 is compared to information in the local database to determine if the information matches sufficiently, such as to a predetermined threshold, to identify the individual 226. If the individual 226 corresponding to the contemporaneously obtained information matches the information of an individual 226 who is permitted to board and/or entry into the country, the individual 226 is allowed to pass, e.g., board. If the individual 226 does not match, the process may be iterated a predetermined number of times before the individual 226 is rejected, a recommendation or prompt is given to recommend another or alternate procedure, or the like. It should be appreciated that matching may be performed using a proprietary algorithm, e.g., a facial recognition algorithm, a combination of algorithms or biometric data, or information can be compared in a generic form. An example of the latter situation is a collection device 232 or local server genericizes the data before comparing the recently captured information to that which is historical (obtained at a different point in time, such as enrollment of the individual 226 in the identification program).

Additionally, the transaction handling method 400 can permit, for example, the local resource to accept changes to biometric and/or biographic information that is promulgated back to the central resource 234 at a predetermined time or on the occurrence of an event, e.g., availability of resources. For example, Jan's address changed, but his information otherwise meets a predetermined threshold, the updated information is communicated to the central resource 234 for inclusion in the database. In another example, a young individual's facial image or facial recognition information is automatically added to the record to better identify a passport holder as he/she ages for the period of time his/her passport 246 is valid. In this way, so long as a child/young adult makes use of a system employing the method his/her passport life may be extended with the provision that entry/exit is limited to times when updated images or facial recognition information is available to the system.

In embodiments, central resource 234 and/or a local resource (a local server, collection devices 232, etc.) can set a flag on, for example, a name record including one or more of biometric or biographic information for a specific individual 226. For example, the central resource 234 sets a flag on a record that is being released to (e.g., used by) a local resource. In this manner, until the local resource releases the flag (or the central resource 234 does so on its behalf), no other local resources can make use of the name record. Thus, if for some reason the local resource loses communication with the central resource 234, the system (via the flag)

ensures that record cannot be reused while communication is broken. The local resource that set the flag can use the information included in the initial list from the name record to match an individual 226 to his/her information as reflected in the name record on the central resource 234. It should be apparent that such a decision may be a provisional decision that is ratified once communication is reestablished with the central resource 234. The local and central resource 234 can reconcile their information once communication is restored or thereafter based factors including priority, communication and processing resources, and the like.

In other instances, upon a lapse in communication between the central resource 234 and a local resource that has been populated with information, the local resource (server, collection device 232, and so on) is prevented from matching an individual 226 until communication is reestablished or may be permitted to do so provisionally.

An operation to generate a final manifest 432 is representative of generating a final manifest that includes information from the comparison 430. The final manifest may identify information for the individuals 226 that are traveling on a particular vehicle, a flight. In some implementations, in addition to identifying those individuals 226 that boarded, the manifest may include or the information generated during screening is otherwise associated with the manifest and/or an individual 226 associated with the manifest. For example, facial recognition information for a lap infant is associated with the individual 226 with who the infant is traveling, e.g., the parent or legal guardian. Thus, relational information from screening and/or the mode of travel (flight) can be associated with the individual 226. An example of the latter information is information that associated an individual 226 with screening or travel information that is not directly associated with the individual 226 himself or herself. In the illustrated embodiment, the final resource is sent to the central resource 234 as part of closing out the transaction with the central resource 234. The central resource 234 can release the flag as part of this or responsive successful closeout.

Having explained routine and exception-based information handling, example data flows are now discussed to permit further understanding of the methods, systems, software, components, disclosed herein.

FIG. 5A

Figure 5A:
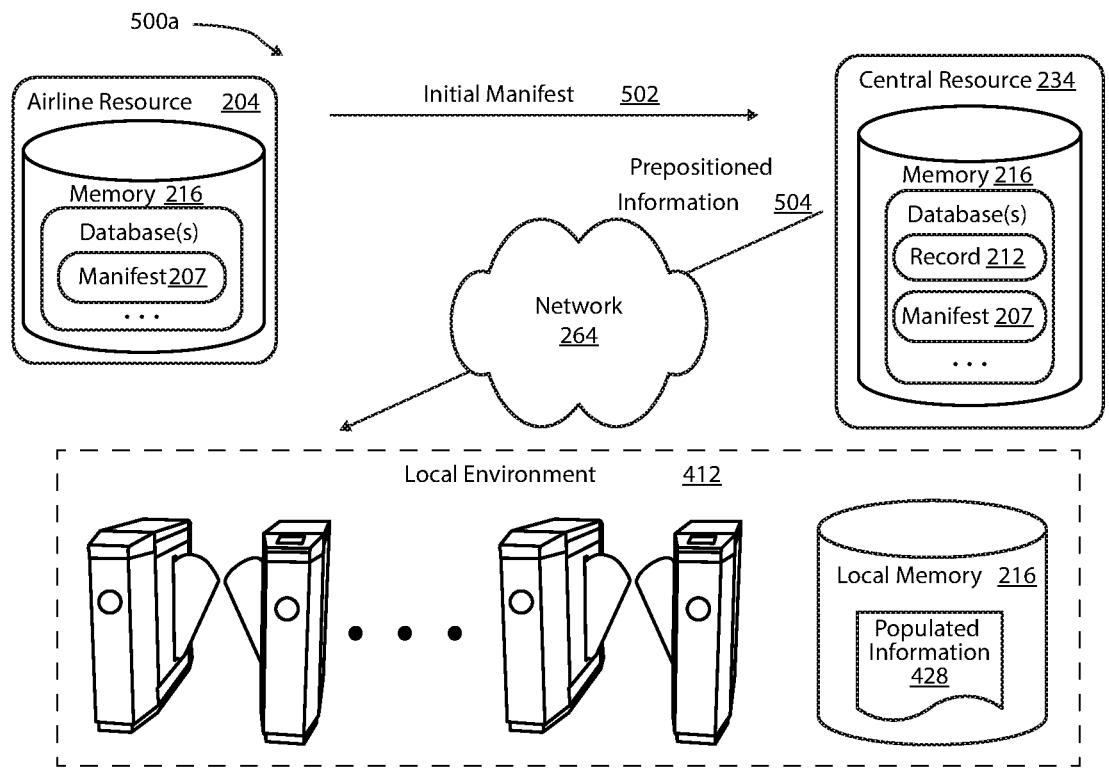
FIGS. 5A-5C illustrate sample data flows in conjunction with hardware/software in accordance with an embodiment. The example hardware/software that is disclosed, the steps, methods, and approaches are not restricted to the illustrated hardware/software.

FIG. 5A is a high-level illustration of an example environment 500A including, for example, an airline resource 204 (e.g., a ticketing server) communicating an initial manifest 502 for an upcoming flight. For example, the airline resource 204 sends the initial manifest 502 approximately twenty-four hours prior to scheduled departure. In other instances, the initial manifest 502 can be sent earlier and accumulated by the central resource 234, or to another resource acting on behalf of the central resource 234, i.e., an intermediate resource that is dedicated to accumulating manifest information until it is communicated for batch processing by the central resource 234. The information in the initial manifest 502 can be communicated in encrypted and/or packetized format according to various communication standards, e.g. TCP/IP protocol. The packet header can include a variety of information to aid communication, data validation, error checking, and so forth.

The information, once received by the central resource 234, can be processed and stored in a memory 216 associated with the central resource 234, e.g., redundant data storage like a RAID system. While memory 216 is illustrated as being designated within the "central resource" it is to be apparent that memory may comprise cloud storage (supported by physical data storage) or physical memory that is geographically distinct to prevent, among other considerations, destruction due to natural or manmade disasters. The central resource 234, in addition to one or more of checking, validating, correcting, formatting or genericizing the information, can store it for subsequent use in screening individual 226 entering/exiting a country. For example, the information is stored in a name record that associates biographic and biometric information for an individual 226. The name record may have been established when, for instance, the individual 226 enrolled in a program, e.g., obtained a passport 246 from his/her county. While the information may be stored in physical proximity in memory, in some instances the central resource 234 indexes the information to aid retrieval and/or permit portions of the information to be stored separately, while being associated by the index. Although all the information in the initial manifest 502 can be stored, in some examples less than all the information is added, or used, to update previous information, e.g., an address change. The central resource 234 can be configured to store the manifest itself, in addition to or in place of decomposing the information into individual records. For example, instead of maintaining the manifest in total, the central resource 234 is programmed to store a portion of the information for rapid access, while the central resource 234 indexes the remaining information. The foregoing indexing may include indexing information that previously exists in memory, but that corresponds to information in the manifest.

As discussed previously, the central resource 234 can be configured to build an initial list from, among other resources, information from the manifest, any updates that occurred prior to a criterion being met, and updates handled via routine processing and not exception handling. An example of the foregoing is the central resource 234 building the initial list the night before the flight is to occur and communicating the information at that, or near that time, or at some point in time prior to estimated departure of the flight. The central resource 234 may packetize and/or encrypt the information as prepositioned information 504 for communication over network 264.

Upon receipt of the prepositioned information 504, the local resource can populate memory with information in a format that mirrors that of the central resource 234 (e.g., name records) or may hold the information forming the list in a unitary form (not that the data is held in sequentially located memory), such as for access by data collection device 232, e.g., electronic gates capable of collecting biometric/biographic data from individuals 226 and objects associated with individuals 226, e.g., information magnetically encoded on a driver's license. The local resource can perform a variety of tasks as part of this process. For example, the local resource checks information, examines packet header information, performs error checking, decrypts the information using public/private key encryption, and so forth prior to storing the information for subsequent use.

FIG. 5B

Figure 5B:
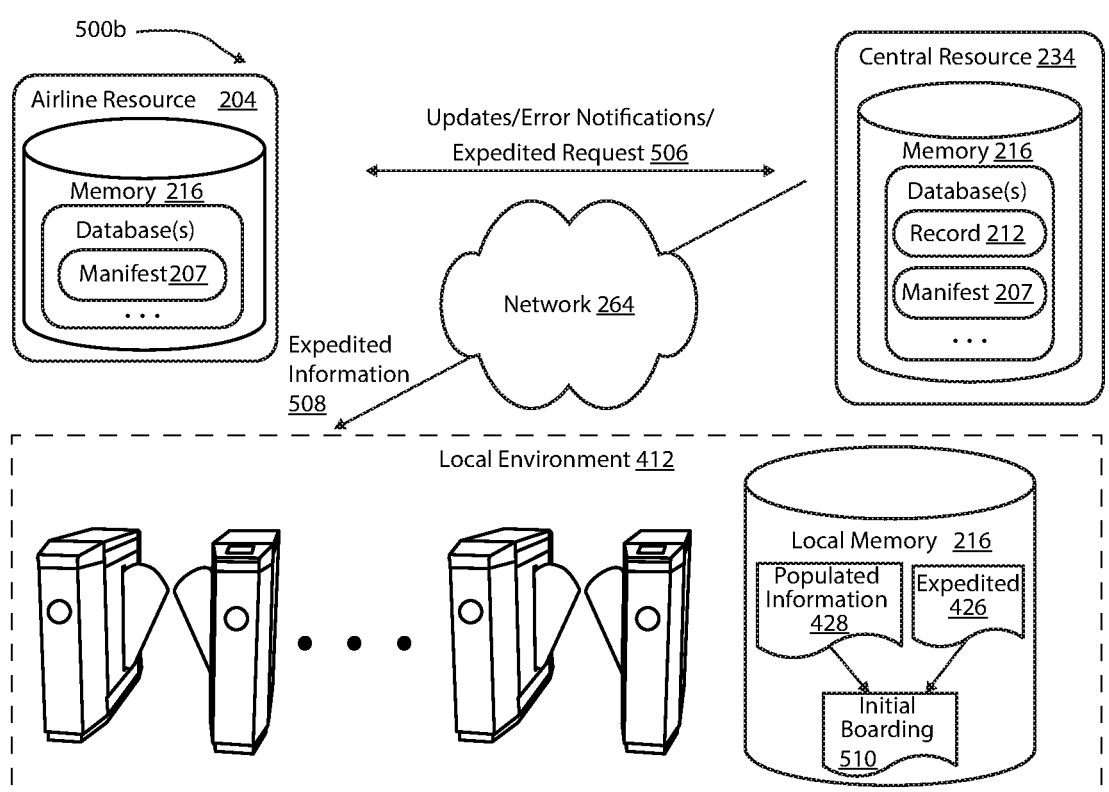

FIG. 5B illustrates an environment 500b that may be substantially similar to that illustrated in FIG. 5A, but at a different point in time. For example, environment 500b represents environment 500a after the occurrence of a criterion being met 414, e.g. eight hours prior to anticipated departure of flight 5400 carrying the previously-mentioned Jan from Stockholm to Denver.

Once the criterion is met, one or more of the airline resource 204, central resource 234, or local resource (including local memory 216) can operate in expedited information handling mode. In the expedited handling process, a request for service may be initiated by the airline issuing a request. "Updates/error notifications/expedited request" 506 is illustrative of such a request, in addition to other functions/communications handled by the airline and central resources 234. An example of this may be a request to add an individual 226, William, to a flight for which the criterion is met and/or a corresponding initial list has been sent. Although one such request is illustrated, in embodiments a common carrier or other entity requesting service batches together requests for service by aggregating requests such as the current request for a particular flight or those requests generated in a particular time period although not for the same transaction or flight. "Updates/error notifications/expedited request" 506 is also representative of communications from the central resource 234, such as a notification that the task is complete.

As described in connection with FIG. 4, the central resource 234 can prioritize the request, issue an interrupt as appropriate, access the information using an index that identifies the physical location of the information in memory, process the request, packetize and/or encrypt the information along with any instructions to be carried out by the collection device 232 or local resource involved. The information can be identified by a unique identifier like a passport number that is referenced in the index to the location of the corresponding data. In addition, the central resource 234 may set a flag to prevent information from being used until the flag is removed, such as upon receipt/processing of a final manifest 432 by the central resource 234.

In embodiments, the central resource's expedited handling process 418 may be substantially similar to routine data handling, although it may be done to a greater extent based on a variety of factors or include different instructions for the local environment 412. In other embodiments, additional procedures are used if the transaction meets a particular threshold, e.g., there is a discrepancy in biographic information.

Once processed, the central resource 234 communicates the relevant biometric/biographic information to the local environment 412, illustrated as expedited information 508. In addition to the biometric and biographic information, expedited information 508 can include reference information that associates the expedited information 508 with that of the initial list (populated information 428). In this way the central resource 234 can instruct the local resource to add the relevant information from the expedited data set for use in the initial boarding list 510.

FIG. 5C

Figure 5C:
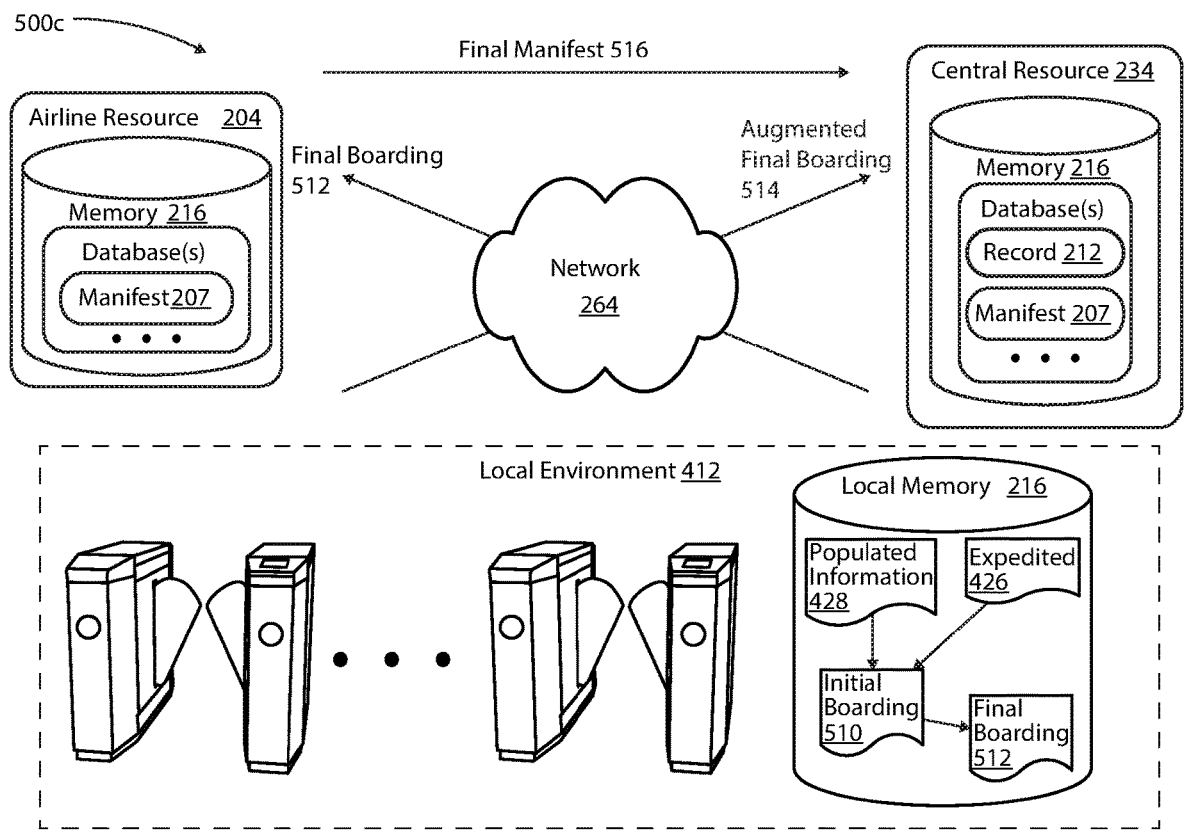

FIG. 5C illustrates an environment 500c that may be substantially similar to those illustrated in FIGS. 5A and 5B, but at a different point in time. As shown, 500c illustrates the local environment 412 generating a final boarding list 512 that indicates which of the individuals 226 from the initial boarding list 510 and any expedited dataset 426 or expedited datasets boarded. The final boarding list 512 may include additional information, such as updates or additions to biometric/biographic information to be communicated to the central resource 234. For example, in addition to sending the names of individuals 226 who boarded a flight, the local resource provides images of William when central resource 234 requests this information. Although final boarding list 512 is illustrated as communicated to both to the central resource 234 and airline resource 204, it should be appreciated that the local resource in the local environment 412 may provide different information in the final boarding list. For example, the local resource communicates additional biometric information to the central resource 234 as the augmented final boarding list 514 while the airline resource 204 receives biographic information, namely, the final boarding list 512. In additional embodiments, boarding information is routed through the central resource 234 for subsequent communication to the common carrier (airline). In still other embodiments, the central resource 234 only receives information it instructed the local server in the local environment 412 to provide, e.g., an updated fingerprint image of Jan.

FIG. 5C also illustrates the airline resource 204 communicating a final manifest 516 to the central resource 234. The final manifest 516 is representative of, in this instance, the airline's final list of biographic information for individuals 226 that boarded the flight. The final manifest 516 can include information updated as a result of screening/boarding the aircraft. In addition, it can include information generated subsequent to screening/boarding. For example, it may include flight updates for the individuals 226. Thus, the final manifest 516 can indicate that William will miss his connecting flight to Montreal, and will have to remain in the U.S. overnight until the subsequent day. Other changes that may be reflected in the final manifest 516 include information captured, but not communicated to the central resource 234 as part of an expedited request. Instead of sending all biographic information for an individual 226 that was available to, in this instance, an airline resource 204, some routine or biographic information that is of minor importance, or not requested or anticipated to be used as a basis of a decision by the central resource 234, is sent after boarding or departure. In some instances, the information is communicated based on the availability of resources, e.g., communication resources, computing resources.

This disclosure will now turn to discussing enrollment and use of biometric/biographic information for screening individuals 226, such as by matching an individual 226 to information provided during enrollment. Additional information, beyond that obtained during enrollment, can be used to perform biographic matching. For example, a historic image from a previous trip (or information derived from historic biometric information) is at least partially used to match the individual 226. Although particular steps are described, it will be appreciated that the information use, or the steps, techniques, and approaches can be varied to make efficient use of the computing and communication resources available. Moreover, it is to be understood that the system and devices performing the steps, approaches, and techniques can implement them in an adaptive manner based on a variety of factors that include, but are not limited to, available communication and processing resources or threat conditions to focus resources on transactions that are comparatively more problematic or pose atypical risk.

FIG. 6

Figure 6:
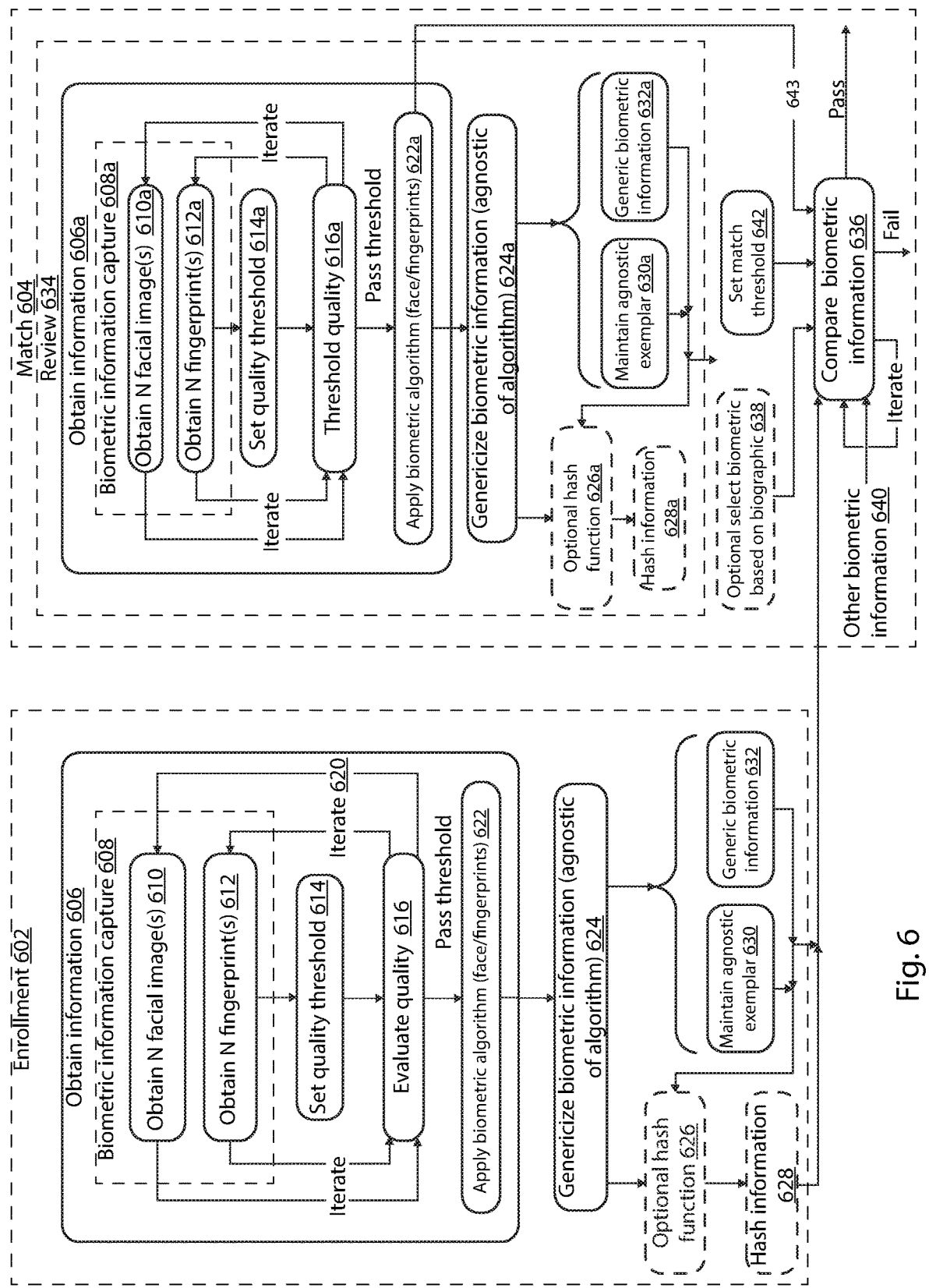
FIG. 6 includes flow diagrams illustrating methods for enrolling and reviewing biometric information for individuals in accordance with embodiments. Embodiments are described where biographic data is also implemented in conjunction with enrolling and reviewing biometric information.

FIG. 6 is a flow chart illustrating example procedures for enrollment 602 and matching 604 of individuals 226. This disclosure will initially focus on enrollment 602 and then discuss how information obtained during enrollment 602 is used for matching 604 an in-question individual 226 to the information established during enrollment, i.e., his/her identity. Although biometric information is primarily discussed, biographic information can be collected and used in conjunction with obtaining information 606 and using it.

For example, a unique identifier (e.g., passport number, name) is associated with biometric information to streamline use of the biometric information in matching 604. One example of streamlining is using biographic information to identify biometric information that is to be used as a basis of matching information for an individual 226 in question.

Associating biographic with biometric information can minimize the computation burden associated with matching captured biometric information to historic biometric information. The foregoing may be done to minimize the burden on resources. In some examples, however, captured biometric information is compared to multiple sets of biometric information. This might be done if, for example, biographic information is not available. This might also be done to learn the identity of an individual 226 which might be needed if information for an in-question individual 226 does not meet a threshold, or to determine if the individual 226 has previously enrolled.

For example, a system operating in accordance with the method shown in FIG. 6 down-selects biometric information of individuals 226 having names that are similar to or otherwise potentially relevant to Jan's name as part of an enrollment 602 or matching 604 processes. For instance, if a known terrorist uses an alias similar to Jan's name, the system can be configured to also compare Jan's biometric information or a portion thereof to that of the known terrorist to ensure the known terrorist is not posing as Jan. This is to say, a system operating in conformance with this disclosure can perform negative matching (excluding) in addition to positive or affirmative matching. This can be performed during enrollment 602 to minimize the likelihood of an individual 226 enrolling using another person's identity or during matching 604. Like affirmative matching, negative matching may be done to a predefined threshold to ensure the in-question individual 226 is not associated with information for an excluded individual, e.g., the known terrorist.

Biographic information can be collected contemporaneously with biometric information during enrollment 602.

As illustrated, enrollment 602 includes biometric information capture 608. In embodiments this includes obtaining a facial image 610, a fingerprint 612, or an iris image. Although facial image capture is primarily discussed, it is to be apparent that other biometric attributes can be handled in a similar fashion. Other example attributes include, scars, walking habits, and body proportions, and so forth that are indicative of an individual 226.

When capturing an image, the device implementing the method can capture multiple images. For example, a digital camera captures a video of an individual's face or different wavelengths of energy are used/captured, e.g., visible light and near-infrared light. In some instances, the individual 226 is instructed to remain in a fixed position during image capture, while in others a video is obtained while the individual 226 moves to a pre-established position at which he/she is to remain. In examples in which multiple images are obtained, information can be obtained from one of the images, e.g., a single image, or information is obtained from multiple images. For example, biometric information that is to be stored is amalgamated from multiple images.

As illustrated, enrollment 602 includes setting a quality threshold 614 for the biometric information to be captured. The quality threshold may be set at various times, e.g., a predetermined time before enrollment 602 commences or during enrollment 602. For instance, a system dynamically sets the threshold based on a variety of factors including, but not limited to, biographic information (age), risk factors (e.g., suspicious passport loss, previous travel), biometric features (e.g., presence or absence of facial hair), or a security level for the system, entity, or country.

A wide variety of image quality assessment (IQA) algorithms and other biometric information quality threshold algorithms can be used by a device performing the method. Examples include a maximum likelihood difference scaling (MLDS) algorithm, full-reference (FR) and reduced-reference (RR) algorithms, a structural similarity index (SSIM) algorithm, and the like for determining whether a captured image is of sufficient quality for use.

The captured biometric information, e.g., a facial image or information from an image, is used in quality evaluation 616 to determine whether the biometric information meets the threshold for quality. For example, a device performing enrollment 602 implements an image quality algorithm to determine if an image is sufficiently sharp, has acceptable contrast, meets a hue standard (e.g., color is accurate to a standard (RGB standard)) so as to be suitable for use. In the preceding sentence, "suitable for use" may be mean used as an image, e.g., for display to a user. In other instances, "use" includes serving as a basis for obtaining facial recognition information.

Responsive to a determination that the biometric information meets the threshold (see "pass threshold" in FIG. 6), the method proceeds to biometric algorithm application 622 on the captured information. Responsive to a determination that the biometric information does not meet the threshold (non-pass or failure), additional biometric information is obtained or previously obtained biometric information is evaluated until it meets the threshold. The thresholding process can iterate 620 until the occurrence of an event, until a set number of iterations are performed, or until a predetermined period of time, e.g., iterating for thirty seconds. The foregoing presumes the threshold is not met during the specified period or the criterion is not met.

A biometric identification algorithm is applied to the biometric information (e.g., facial image, fingerprint image, iris image) during biometric algorithm application 622. For example, the work station 262 (see FIG. 2), applies a facial recognition algorithm to information forming a facial image, of an individual 226, captured during enrollment. In this example, the facial image is information from an image that passed the threshold, so it is suitable for use.

Biometric identification algorithms can implement a variety of approaches for obtaining information, such as calculating or otherwise processing information to generate a signature that is indicative of the underlying biometric information. For example, the facial recognition algorithm derives a biometric signature of a person's face from the information comprising the image such as by extracting information of features that can be used for identification. In embodiments, a biometric signature is information that maps biometrically identifiable features. The facial recognition algorithm, for instance, can map facial features including relationships between features in order to develop a biometric signature of the individual's face. Example features include, but are not limited to, eyes, nose, skin, ears, mouth, and other facial features (moles, freckles). Other features include facial hair (e.g., hair patterns), skin wrinkles, eyelids, mouth shape, hand geometry, signature, voice, and lips.

A variety of algorithms can be used for facial recognition and it should be apparent that a system employing the method may use different algorithms, whether proprietary or not. For example, individual work stations 262 and collection devices 232 (e.g., kiosks, electronic gates) may use different algorithms. Example algorithms include, but are not limited to, principle component algorithms, Eigenface-based algorithms, algorithms using elastic matching, and algorithms employing linear discriminant analysis. Additional algorithms include Fisherface-based algorithms, hidden Markov model-based algorithms, and multilinear subspace learning algorithms. In some embodiments, combinations of algorithms and approaches can be used.

Fingerprint analysis can be performed in a manner similar to that of facial recognition. For example, a fingerprint mapping algorithm is used to identify features that are indicative of the individual's fingerprint represented in an image in a digital format. Example fingerprint, multi-fingerprint, palm print, and "slap print" algorithms include, but are not limited to, the Vucetich system, the Roscher system, the Juan Vucetich system, or the Henry System.

Other algorithms based on pattern recognition can also be used. Similar to the discussion regarding facial recognition, a fingerprint algorithm can generate a signature, sometimes referred to as a template, which represents the fingerprint represented in the image, i.e., the captured fingerprint. While a biometric signature is obtained for the fingerprint, it should be evident that the underlying image, e.g., an image of the fingerprint, can be maintained for use. A fingerprint image, similar to that of other images discussed herein, can be maintained in a variety of formats, including, but not limited to: jpeg, tiff, gif, pdf, rif, png, ppm, bpg, cgm, svg, and rs-274x.

Example iris recognition algorithms include, but are not limited to, IriScan (IriScan, Inc. Mt. Laurel, N.J.), Iridian (Iridian Technologies, Moorestown, N.J.), Sarnoff (Sarnoff Corp., West Winsor Township, N.J.), Sensar (Sensar, Inc. Moorestown, N.J.), LG-Iris (LG Electronics, Seoul, Korea), Panasonic (Panasonic, Inc. Kodama, JP), Oki (Oki Electric Industry Co., Ltd. Tokyo, JP), BI2 (BI2 Technologies Plymouth, Mass.), IrisGuard (IrisGuard, Inc. Buckinghamshire, UK), Unisys (Unisys, Inc. Blue Bell, Pa.), Sagem (Safran SA Paris, FR), Enschede (Enschede Security Solutions Haarlem, Netherlands), Securimetrics (Securimetrics, Inc. Martinez, Calif.), and L-1 (Morpho, SAS Issy-les-Moulineaux, FR).

In addition to the algorithm's output, additional information can be provided. For example, a computing system performing the method may include metadata that is associated with the biometric information, e.g., the biometric signature of the individual's face represented by the image. Example metadata includes information that uniquely identifies the image, date, time, software version, what software was used, error checking results, physical device information, location, timestamp, vendor information, biometric information, image information, user input information (such as observations from an official overseeing enrollment), and so forth.

Processing continues with genericizing 624 the biometric information. Genericizing 624 can involve making (such as by converting) the information into a format that is agnostic of the way in which the information was obtained. Genericizing 624, for example, includes converting a facial recognition signature into a format that is not indicative of the algorithm used to obtain the information comprising the signature in the non-generic form. An example of non-generic information is biometric data that indicates or is reflective of the use of, for example, a proprietary algorithm to obtain or process the information.

In embodiments, genericizing 624 converts biometric information obtained through the use of a particular type of algorithm, such as a proprietary algorithm, into a format that complies with a predetermined standard that is generic or agnostic of the particular algorithm and/or information capture system used to obtain the information. In some instances, genericizing 624 includes discarding information not in the generic dataset. In other examples, genericizing 624 includes translating the biometric information into a form that is generic from that of the algorithm and/or information capture used to obtain the information. The standards of the American National Standard for Information Systems (ANSI) are examples. Information may be compliant with one or more of NISTIR 6529-A, ANSI/NIST-ITL 1-2000 (for exchange of facial, fingerprint, scar, and tattoo information), ANSI/INCITS 358-2002, standards promulgated by International Committee for Information biometrics committee (M1), INCITS 377, ANSI INCITS 377-2004, ANSI INCITS 378-2004 (Finger Minutiae Format for Data Interchange), or the like standards for exchanging biometric information.

An optional hash function 626 is illustrated. In embodiments, genericized information is hashed, e.g., is subjected to a hash function or has a hash function applied to it. In some instances, multiple hash functions are used for various purposes. Example purposes and, by extension, hash functions include, but are not limited to, mapping information and encrypting the information for communication and/or storage. Although biometric information hashing will be primarily discussed, biometric information or a combination of biometric and biographic information can be hashed as appropriate. Hash function 626 can be used to map biometric information captured in, for example, an electronic fingerprint image to generate a hash code that is indicative of the image.

For example, a hash of an image of individual's fingerprint includes information that is indicative of the fingerprint image as a whole, although it does not include all the content of the image, e.g., information sufficient to entirely represent the captured fingerprint. Some information from, in this example, the fingerprint image, is more indicative than other information in the fingerprint image. Put another way, the hash code (i.e., the result of applying an algorithm that performs the hash) can include information that more accurately identifies the fingerprint, and by association, the corresponding individual 226, than other information contained in the image of the fingerprint. The information resulting from application of the hash function 626 is illustrated as hash information 628. It should also be apparent the underlying information (e.g., a fingerprint image, or a voice pattern) can be maintained even though the information is hashed.

Fingerprint and other biometric matching (whether confirmatory matching or excluding matching) for biometric identification carries a high computational burden. Rather than looking at, for example, all biometric information or substantially all biometric data obtained, an appropriate hash algorithm is applied to generate a hash code/hash sum that may contain less information (e.g., less bytes of data) but remains indicative, highly indicative, or substantially highly indicative of the underlying information, e.g., a facial image, fingerprint image, voice pattern. In this way, the communication and computational burdens on a system or device performing the method is reduced in comparison to handling/processing the underlying information, e.g., the biometric image information. The hash information 628 can be stored in a hash table or other data structure (e.g., a register) as appropriate.

Other hash functions can be implemented in addition to or in conjunction with those discussed. For example, a cryptographic hash function is used to encode information that is intended to remain secret. Example cryptographic hash functions include, but are not limited to, SHA-1, SHA-2, and SHA-3, that are promulgated by the U.S. National Institute of Standards and Technology (NIST), and public-private key encryption algorithms. For example, hash function 626 is representative of applying a biometric hash function to a fingerprint image to obtain hash information 628 and then applying a cryptographic hash, such as SHA-2, to encrypt it for communication (whether internal or external to the system or device) and/or data storage.

Agnostic exemplar 630 and generic biometric information 632 are illustrative of, respectively, maintaining an agnostic exemplar of the obtained information and generic biometric information. Example exemplars include a captured facial image, an image of a fingerprint, a file containing a vocal recording, a video, and the like, that include information that is usable to bio-identify or exclude an individual. The agnostic exemplar 630 in FIG. 6 represents maintaining the captured biometric information in a form that is agnostic of the format used by the particular device used to capture the information or used by devices within the system. In some embodiments, the generic biometric information 632 is maintained in a common format implemented by some individual devices in the system or by none of the devices within the system, e.g., is distinct from native formats. For example, instead of maintaining images in a variety of formats, a system or device implementing the method converts images into a tagged image format file (.tiff).

It should be appreciated that the agnostic exemplar 630 (e.g., an iris image or a voice pattern in a non-proprietary format) and/or the generic biometric information 632 can be encrypted via the hash function 626, such as for security reasons, while remaining in generic or agnostic form. Maintaining a copy of the underlying biometric information permits the system to go back to the original source information, provides information for system users, e.g., a voice recording, or a picture of an individual's face. It permits the system to apply a new or different algorithm to the biometric information, allows for algorithm checking (e.g., accuracy checking), permits the system to use the exemplars to check the system, or acts as a learning or training set. An example of the latter situation is an adaptive facial recognition algorithm training on stored exemplars to improve or confirm its accuracy.

Those of skill in the art will also appreciate that a system/device performing the method can, for instance, compress, transform, or manipulate the obtained information whether biographic or biometric. For example, a work station 262 compresses a file, containing a facial image, prior to storing the compressed file in memory. Example data compression algorithms include Lempel—Ziv-type algorithms, PKZIP, JPEG image compression, MPEG-2 image compression, MP3 format (in comparison to standard digital audio formats), and so on, whether lossy or not.

Turning now to matching 604, the use of biometric and/or biographic information for matching (whether affirmative or negative) is discussed.

Many of the steps, approaches, techniques used in enrollment 602 may be mirrored generally or specifically to those of the matching process. For simplicity, the steps, approaches, or techniques that are similar or substantially similar or generally have a similar basis to those that occur during enrollment are reference by the suffix "a." No negative inference should be obtained for not bearing the "a" suffix. It should be apparent that the information, whether biometric or biographic, may be obtained at a point in time different than that captured or processed during enrollment 602. The foregoing presumes that the individual 226 being screened has completed enrollment 602. For example, a facial image being captured for review process 634 is obtained by a camera or an image collection device for an electronic gate when a traveler seeks to enter or exit a country. It should be appreciated that the same, substantially the same, or different thresholds, algorithms, etc. can be used for matching in comparison to those used in enrollment. For example, the setting of the threshold quality 614*a* is done to a higher level due to a heightened security status, or other criterion than that applied at enrollment or a preceding point in time.

As illustrated, matching 604 can be performed using a variety of biographic and biometric ways to determine whether information obtained at a point in time subsequent to enrollment matches (or is excluded as a non-match of) that obtained at a previous point in time, e.g., historic biometric information.

For example, a system performing the method performs a biometric information comparison 636 for a fingerprint, captured when an individual 226 attempts to enter a restricted area, with a fingerprint provided during enrollment that is asserted, based on biographic information or manual input, to match. While the biometric information comparison 636 can be done by comparing all or substantially all of the biometric information captured during enrollment 602, as discussed above, a subset of the information or information derived from the biographic information (e.g., the output of a biometric algorithm) can be used for the biometric information comparison 636. An optional selection of what biometric information is to be used as a basis for matching can be used to down-select what historical biometric information the currently captured information is to be compared to (illustrated as Optional select biometric based on biographic 638). In the preceding example, a badge number for the individual 226 entering the restricted space is used to locate historical fingerprint information in a lookup table stored in local memory if, for example, the individual 226 was a worker who presented a magnetic or radio frequency identification (RFID) card prior to providing his/her fingerprint. In the preceding example, the historical fingerprint information is prepositioned with the access control device to speed access in comparison to retrieving the information responsive to receipt of the badge number, although this too is possible if, for example, the system did not predict (via an algorithm based on historical access information) the individual 226 would request access.

In embodiments, comparison 636 is iterated until it yields a pass or until the occurrence of an event, until a set number of iterations occurs, or a until predetermined period of time passes, e.g., iterate for thirty seconds. The foregoing presumes the comparison is not met during the specified period or the criterion is not met. In this instance, the comparison "fails" and corresponding processes are triggered, e.g., alert user, deny passage (through electronic gate), capture additional biometric information, issue a "fail receipt", provide a visual indicator, direct the in-question individual 226 according to a fail determination, create a fail record in memory and promulgate it with biometric/biographic information from the event, combinations thereof, and so forth. The foregoing is done responsive to a determination that the comparison is a "fail" and a system/device can be programmed to trigger a variety of responses.

An affirmative or pass outcome is representative of the biometric information comparison 636 indicating the biometric information for the in-question individual 226 matches historic biometric information as designated by biographic information, e.g., a provided passport number. Responsive to this determination, the system performing the method can execute a variety of procedures. Example pass procedures include, but are not limited to, opening an electronic gate or barrier, providing a visual pass indicator, issuing a pass receipt, collecting additional biometric information, updating biographic information (e.g., add the pass event to the individual's biographic information), combinations thereof, and the like programmed responses.

Also shown in FIG. 6 is a match threshold setting 642, representative of designating a level to which the biographic information for the in-question individual 226 has to match the historic biometric information (e.g., enrollment information) in order to pass. For example, setting a match threshold designates a level of similarity that is indicative of the currently obtained information being the same or substantially similar to the enrollment information.

The match threshold can be predetermined based on a criterion. The threshold level can be set manually, such as for a heightened security level, or may be adaptively determined by the algorithm based on one or more criterion that are intrinsic, extrinsic, or a combination thereof criterion, e.g., including intrinsic and extrinsic. In the case of a manual threshold, the predetermined criterion is the user's selection. Examples of an intrinsic criterion include, but are not limited to, date of last transaction, date since enrollment, biometric information quality, lack of biometric information (e.g., missing fingerprint information), age, travel plans, biographic information, or time. Examples of an extrinsic criterion include: threat status, information from other screenings (e.g., an increase level of low quality matches or low quality biometric information from other matches), number of screenings, wait times, and so forth. While a system/device performing the method can dynamically change the threshold, in some instances the system/device implements a floor or minimum acceptable threshold that limits the lowest acceptable match. While individuals 226 can be screened at a higher threshold, the minimum acceptable level sets the lowest match level that can be used, e.g., the threshold level for individuals 226 with the lowest risk, whether real, calculated such as based on biographic information, or anticipated.

In some implementations, historical and subsequent biometric information is compared in a non-generic form. For example, and as illustrated as line 643, biometric information is compared in a proprietary format. In instances such as this, biometric information from enrollment 602 may be transformed into non-generic information by applying an appropriate algorithm, e.g. a particular algorithm used by a device performing the review or implemented in a local environment, such as at an airport. In instances such as this, the local environment can receive the information comprising the exemplar and/or apply a relevant algorithm prior to when a match is anticipated to occur. An example of the preceding situation is a system applying an algorithm responsive to the information being prepositioned with the system performing the method. A non-generic comparison can be used when generic information is unavailable, or when attempted generic matches are unsuccessful.

In some embodiments, information for an individual 226 being screened is compared to biometric information for individuals 226 meeting a predetermined criterion, illustrated as other biometric information 640, e.g., individuals 226 who are wanted by authorities or are to be handled in a particular manner, such as additional or heightened screening in comparison to that used for the majority of individuals 226 being screened. In these embodiments, a comparison is done to exclude the in-question individual 226 based on his/her biometric information from the biometric information associated with those meeting the criterion. The information for the individuals 226 meeting the criterion may be maintained in a register, in for example random access memory (RAM) in a solid-state medium (e.g., in a register in local solid state memory) within the device to promote efficient operation.

In some embodiments, not all individuals 226 being matched will be subject to comparison based on the other biometric information 640. For example, only individuals 226 meeting a prescreening criterion may have his/her information reviewed in this manner. In another example, if all individuals 226 represented in the other biometric information 640 are males, then in-question females may be excluded without review. Other criteria include, age, anthropomorphic characteristics, including but not limited to eye color, height, weight, associated biographic information and so forth.

Those of skill in the art will appreciate that a threshold for non-matching may be set to a lower level than that of matching, e.g., a fifty percent non-match yields an affirmative exclusion while affirmative matching is done to a higher level of correspondence or similarity. In other examples, such comparison is based on less biometric information than that used for affirmative matching. For example, a subset of fingerprint information, such as information that is highly indicative or substantially highly indicative of the overall fingerprint, is used to speed the comparison 636 based on the other biometric information 640. Having discussed enrollment 602 and matching 604, additional embodiments of the methods and structures in accordance with this disclosure are now provided.

FIG. 7

Figure 7:
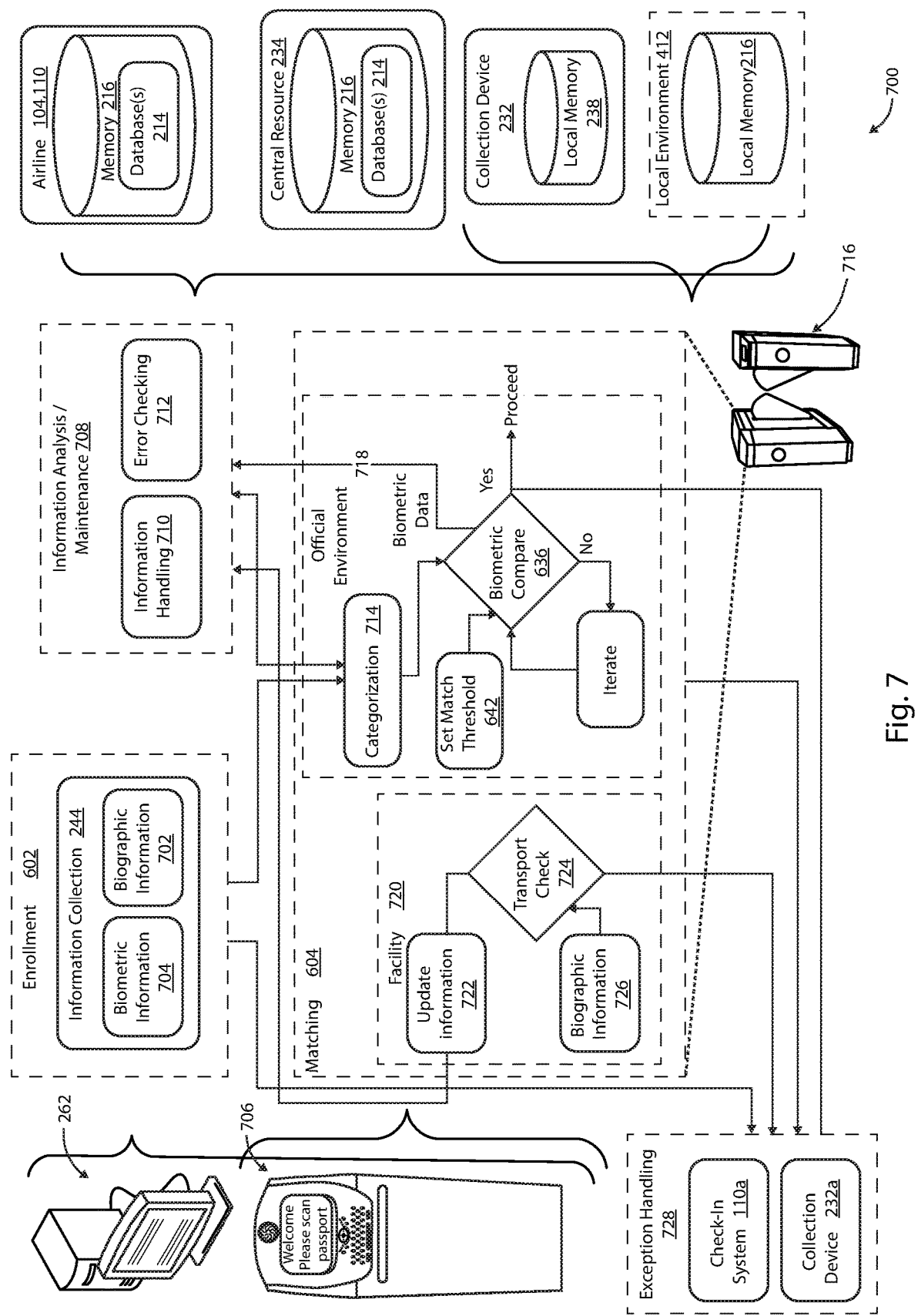
FIG. 7 illustrates example routing and data handling in accordance with embodiments of the present disclosure. Although example hardware/software is disclosed, the steps are not restricted to the hardware/software and vice versa.

FIG. 7 illustrates example environments 700 implementing routing and information handling in accordance with embodiments. Although physical devices are illustrated, it will be apparent that the method, steps, approaches, and techniques are not restricted to the physical device or systems and vice versa. For illustrative purposes, collection devices 232, an airline system 104, 110, a central resource 234, a collection device 232, and a local environment 412 are illustrated in conjunction with the environments 700.

FIG. 7 shows how information, such as biographic information 704 and biometric information 702 can be used in, for example, systems performing the screening of individuals 226 on a massive scale, or other applications that implement biometric information and, particularly, large-scale systems. In embodiments, the systems, devices, methods, techniques, and approaches described in conjunction with FIGS. 1-6 can be implemented with those described with respect to FIG. 7. As shown, enrollment information such as that collected by work station(s) 262, kiosk(s) 706, mobile devices (smart phone, laptops, connected personal devices), sensors, and image capture devices is maintained (see information analysis/maintenance 708) for subsequent use. For example, as individuals 226 enroll, their information is obtained and stored in a redundant manner such as in memory 216 associated with a central resource 234. The central resource 234 or other devices performing the described function performs various information handling tasks 710 such as indexing the information, storing the information, such as in a distributive/redundant fashion, compressing the information, genericizing the information, encrypting the information, and so on as described in this disclosure.

In the illustrated embodiment, error checking 712 is performed on the information. Error checking 712, in addition to checking for data errors due to data storage and computing issues, can also check the information for suitability for use in biometric matching. For example, the central resource 234 periodically, or as a background operation, checks stored biometric information to determine whether it is suitable for use with updated software or algorithms, for use as a training dataset, and for compatibility with an information format. Non-compliant information (e.g., corrupt data or a file with incompatible information) can be flagged for additional review or non-use. For example, responsive to a determination that a fingerprint image is corrupt (whether completely or partially) or does not meet a quality standard, the system can capture the missing, corrupt, or otherwise unavailable information the next time the individual 226 is screened. In other instances, if the underlying information is available, the central resource 234 can recreate the data, e.g., reprocess a fingerprint image to recreate the fingerprint issue that is missing or corrupt. In the previous example, re-creation is performed in a substantially similar manner to that described in conjunction with biometric information capture.

Matching 604 as illustrated represents biometric matching involving multiple environments (e.g., computing environments). In the illustrated embodiment, systems and devices within different environments interact to effectuate substantially seamless matching. The environments contain systems, devices, and components that operate in official, non-official, and commercial settings and can operate on differing levels of trust and transparency. For illustrative purposes only, an official environment (see FIG. 7) is an environment that is associated with a high trust level and may operate at least partially in an opaque manner to obscure selected information and processes. For example, while systems, devices, and components operating in the official environment may communicate and interact with a facility environment, such as one run by a port authority or a quasi-governmental entity, it may do so without granting a reciprocal level of access to systems, devices, components in a commercial environment (e.g., airline resources such as reservation system 104, or check-in system/collection device 110) or in the facility environment.

As illustrated in FIG. 7, individuals 226 can be categorized by a categorization process 714, prior to performing the matching 604, based on a predetermined criterion. In the illustrated instance, individuals 226 are categorized according to whether he/she is in-scope or out of scope. For illustrative purposes only, in-scope and out of scope correspond to particular legal statuses. For example, citizens, diplomats, and permanent residents are screened differently or to a different extent than individuals 226 that are in-scope.

As previously discussed, matching includes a biometric information comparison 636 that compares the subsequently-captured biometric information with historical biometric information (e.g., biometric information 704) to associate an individual 226 via his/her information with corresponding historic biographic information 702, e.g., name or passport number. The biometric information comparison 636 can be iterated until an affirmative response is obtained or a predetermined criterion is met, e.g., a percent match is less than a designated level such as seventy-five percent. The threshold for the biometric information comparison 636 is set in the match threshold setting 642. Although a percent match or a level of similarity that is to be met is predetermined prior to performing the biometric information comparison 636, it should be apparent that the percentage can vary between discreet instances. For example, responsive to information indicating that criminal or illegal activity is anticipated, the match level is raised from a ninety percent match to a ninety-five percent match for the entire system or a portion of the system, such as a particular facility. In another instance, a system or device performing the method is programmed to randomly raise the threshold beyond a base threshold (e.g., a minimum acceptable pass) to deter individuals 226 attempting to pose or circumvent the system. An example of an intrinsic factor is a lack of or the poor quality of another type of biometric information. For example, a system or device performing the method is programmed to apply a higher match threshold when comparing one type of biometric information if another type of biometric information is missing. Thus, an electronic gate device can be programmed to implement a ninety-seven percent match to a facial identification, rather than a ninety-two percent match, if, for example, no historic iris information is available for the individual 226. Naturally, the system or device performing the method can capture the missing information or substitute information if the information is of poor quality, e.g., the file containing an image lacks information or the quality of the information does not meet a predetermined quality threshold.

A successful match, e.g., the comparison meeting the predetermined match level, is illustrated as "proceed." For example, responsive to the system or device determining that the comparison meets or exceeds the match threshold, the electronic gate or other access control device 716 opens to permit the individual 226 to pass. As with the method, techniques, and approaches discussed with respect to FIG. 6, those of FIG. 7 can be used with non-matching or confirming information associated with an in-question individual 226 does not match that of individuals 226 that meet a predetermined criterion, e.g., information associated with a criminal or a missing individual 226.

In some instances, a system or device performing the method is configured to dynamically change the threshold level. If, for instance, a match is not made within the first three tries, a system or device performing the method is programed to elevate the threshold level from a first level to a second or different threshold level to ensure system accuracy, to avoid inadvertent mismatching, etc. In situations such as this, the first level can correspond to a match level that is typically obtained for the majority or a substantial majority of the population being screened, while the higher level corresponds to a heightened level of scrutiny that a smaller percentage of the population of the individuals 226 being screened must meet or exceed. The threshold level can dynamically change based on other criteria, such as image quality, or when historical information is missing/corrupted for another type of biometric information. An example of the foregoing is a system imposing a higher match threshold when the concurrently captured image meets a criterion, e.g., is of a poor quality according to a predetermined criterion. Another example is a system programmed to apply a higher fingerprint match threshold when voice pattern information is missing.

As illustrated, biometric data 718 gathered during matching 604 is communicated or stored for subsequent use. For example, the system or device updates the biometric information for the individual 226 in question if he/she has not recently used the system, is young, or has changed his/her appearance (e.g., recently grown a beard), or has passed the comparison but not sufficiently, thereby indicating a weak or minimal match.

Turning now to the processes, procedures and techniques illustrated in conjunction with the facility environment 720. In the illustrated embodiment, the facility environment 720 corresponds to steps and devices that, for example, are performed or managed by an entity that supports matching 604, but may operate on trust level lower than that of the official environment. In embodiments, procedures, devices, information in the official environment may be opaque to activities and devices in the facility 720 to prevent misuse, cyberattack, hacking, and so forth.

For example, the official environment contains a firewall that blocks or minimizes what information, requests, and so forth can pass between the official and facility environments. The firewall can also obfuscate or generalize the structure within the official environment and/or the central resource 234. In other embodiments, the official environment, such as a customs computing system in an airport, is isolated by a firewall separate from that of an environment containing the central resource 234 and/or the information analysis/maintenance 708. Thus, in some instances the central resource 234 operates at the (comparatively) highest level of trust/security as that of the official environment (e.g., the local server, collection devices 232), and the facility functions at a lower level of trust/security.

The illustrated embodiment highlights a situation in which biographic information is presented that is not available to a system, e.g., an airline system like the reservation system 104, or the check-in system/collection device 110. An example of such a situation is an individual 226 changing flights. In this situation, the biographic information (e.g., a boarding pass) is not yet entered in the system and the individual's biographic information populated to, for instance, a flight manifest. In this instance, the biographic information associated with the boarding pass is checked (see transport check 724). A system performing the check may do so by issuing an expedited request to interrupt the information analysis/maintenance 708 function which may be supported by the central resource 234. If the transport check 724 is successful, e.g., the biographic (travel) information associated with the boarding pass corresponds to the information for an individual 226 who is to be on the flight, the biographic information 726 is updated 722 such as by adding the information to the manifest for the flight.

In instances where the transport check 724 results in a negative decision, the information can be routed for exception handling 728. This can involve checking biographic information associated with the boarding pass, or other token, to determine if it is associated with, for instance, another flight, train, or ship. For example, an individual's biographic information is associated with a canceled flight. In the foregoing example, a system/device performing the method can associate or re-associate the individual's information with a new or different flight so his/her biometric information 704 can be associated with the new or different flight, train, ship, other mode of transportation, or an event, e.g., a college placement testing session. Exception handling 728 can be handled by a variety of devices and systems. As illustrated, an airline system, like a check-in system/collection device 110a (for clarity the suffix "a" has been added), or airline work station handles the task. In other instances, exception handling 728 is performed by a device or a component included in an official system, such as a work station or a collection device 232a like a kiosk. As should be apparent, in some embodiments, exception handling 728 may involve routing an individual 226 to a representative or a customs official that may manually override the system/device/component performing exception handling to cause the method to achieve a user-designated result, e.g., associate the information for the individual 226 with a particular event, mode of transportation, or the like.

FIGS. 8A and 8B

Referring now to FIGS. 8A and 8B, methods, approaches, devices, and techniques for capturing and utilizing biometric information are described. In embodiments, a system or device performing biometric matching captures multiple versions of a particular type of biometric information in order to down-select one or more individual instances for use. For example, instead of capturing a still image for use in facial recognition, a system operating in accordance with the illustrated embodiment captures a video composed of a plurality of images, e.g., frames. The foregoing may be done in order to obtain one or more images that are suitable for use in biometric identification.

It should be apparent that while down-selecting and use of a subset of the information is implemented for one purpose the underlying information can be used for other purposes. For example, in the case of a video, one or more images are used for facial recognition while the overall video or a portion thereof is used to determine the individual's walking pattern.

FIG. 8A

Referring to FIG. 8A, from left to right with respect to the caption "FIG. 8A", an individual 226 entering, moving through an area, capturing formal information (biometric), being delayed, and exiting the area that includes an electronic access control device with, for example, an image capture capability, is illustrated. An example of such a situation is a customs or security screening area included in an airport. In the preceding example, whether formally or informally designated, an information collection device, such as may be in or associated with an access control device, is configured to capture a video of the individual 226 as he/she enters a field of view, proceeds through, and exits an access-controlled area.

Capturing a video (e.g., multiple images) permits a system or device employing the method to down-select from among the images, such as by using an algorithm that determines a quality score for in-question images. As discussed, one image will be used for, in this instance, facial recognition. In other instances, more than one image is used as the basis for biometric information matching. For example, an electronic gate is configured to identify a predetermined number of images that meet a predefined image quality level and then to compute an average facial recognition signature that is compared to a facial recognition signature associated with a passport. One example of why this may be done is in situations where biometric information from multiple angles (relative to the device capturing the information) is more accurate than that obtained at a single point in time or from a single perspective, although this too is contemplated.

Respectively, the stages are illustrated as initial entry 802, moving area 804, formal information capture 806, report hold 808, and exit 810. Although illustrated as discrete steps or phases, it will be appreciated that the process may be unitary and capture, or at least partially capture other individuals 226 in the area or adjacent areas. Moreover, the video may be compiled from more than one information capture device. For example, a resulting video is composed of video from one or more surveillance cameras as well as a camera included in an electronic access control device. The biometric information input (e.g., the different videos) may be synchronized using a common clock in order to merge biometric information from a single point in time or a substantially single point in time.

In some instances, the information capture devices have different capabilities, e.g., cameras/image capture devices operate at, for example, different wavelengths based on a variety of criteria. Here too the information is synthesized to generate a dataset that can be used for generating a biometric signature for comparison to that on record to match the in-question individual to that of an individual stored in memory via his/her biometric information. While individual devices, e.g., electronic gates with information collection functionality, are discussed, in other instances an "overall" system, such as for an airport or a portion of a facility, can be used and perform the methods/steps. In instances such as these, the electronic access control devices (e.g., "mantraps") including information collection capability may be considered "thin devices" with limited resources while a system for the facility, such as an airport, handles the bulk or majority of the information processing.

FIG. 8B

With reference to FIG. 8B, biometric information analysis commences from a predefined point in time or a predefined event, in embodiments. For example, determining which image is to be used from a video for biometric matching commences from a predetermined point. An example of the foregoing is an electronic gate being programmed to determine whether a formal image is of sufficient quality to be used for matching. If the formal image is of sufficient quality as determined by an applicable algorithm, the image is used. In contrast, if the formal image is not of sufficient quality (e.g., the image is blurry or the individual 226 closed his/her eyes), the algorithm causes, in this case, the electronic gate to analyze an image that is after the formal image to determine if it is of sufficient quality. If it is, then the subsequent image is used. If not, then the process iterates according to the algorithm. It should be apparent that the device may set a flag to identify the particular data upon which matching is based. For example, a processor in a server for local environment 412 handling matching for the electronic gate sets a flag to indicate which frame of a video is used for facial recognition.

Line A 812, Line B 814, and Line C 816, illustrated in FIG. 8B, show example approaches for analyzing which image or images to use. For example, line "A" illustrates analyzing images from initial entry 802 until an image meets a predetermined threshold, e.g. is of sufficient quality for use or meets a particular criterion defined by the algorithm. In this example, the method can still include obtaining a formal image, while in other instances a device performing the method dispenses with requesting and obtaining a formal image. In other instances, even though biometric information that will be used for matching has already been obtained, the method can still include requesting/obtaining a formal image for record purposes, for use in updating or augmenting the individual's biometric information, or record information. In other instances, an unused formal image is discarded.

Line B 814 of FIG. 8B represents the initiation of biometric information suitability analysis occurring from a formal biometric information capture. As illustrated, analysis for suitable information commences with an event, e.g., formal image capture, and may proceed with evaluating information that is subsequent to or precedes the formal information capture event. It is to be apparent that this process may proceed in a variety of ways depending on a variety of factors. For example, if computing resources are available, suitability commences according to line A 812, while a line B 814 approach is used when resources, comparatively, are less available.

Example procedures include, but are not limited to, analyzing information subsequent to the predetermined event for a particular time or number of iterations and then analyzing information that precedes the event in reverse chronological order until suitable information is located. In other instances, a device performing the method switches between information obtained prior to and subsequent to the event, e.g., the computer/processor analyzes images just prior to the event and, if it does not meet the predetermined threshold, it analyzes an image just after the event, e.g., an image immediately after the formal image or a set period of time or number of frames afterward.

In still other instances, more than one image (e.g., a block of information/images) is analyzed for suitability before switching to images that occurred on the other side of the event. For example, ten images occurring after an event are analyzed before analyzing ten images obtained before the occurrence of the event. The foregoing presumes that a suitable image is not identified in the ten subsequent images.

It should be apparent that the system can also switch based on a predetermined criterion, such as image quality. In this instance, according to an applicable algorithm, if the image is sufficiently low, or, for example, a face is not recognized, the device is configured to switch to other portions of the information, e.g., another part of the video.

These processes can iterate until information meeting the predetermined threshold is located, at which point the analysis terminates and the information is used for comparison, e.g., hashed and then the hash is compared to a hash of corresponding information for the presented token, e.g., passport 246. A device performing the method optionally can set a flag to identify the particular information used, e.g., the information meeting the predetermined quality threshold.

As also illustrated in FIG. 8B, line C 816 is representative of commencing an analysis from a report hold 808 event. Much like the process discussed in conjunction with line B 814, information can be analyzed in a variety of ways as determined by the device's software. For example, an image or multiple images corresponding to a report hold 808 are evaluated for suitability, e.g., image quality. The method continues to analyze images occurring just prior to the report hold 808, presuming an image corresponding to the report hold 808 does not meet the threshold. For example, responsive to a determination that an image or images corresponding to the report hold 808 are not sufficient for use in biometric matching, a processor checks information associated with the formal biometric information capture (e.g., the formal image) to determine if it is suitable for use.

A report hold 808 is representative of a timeframe after one or more of biometric information is captured or formally requested, but before one or more of the following has occurred: the in-question individual 226 is permitted to pass (e.g., the electronic gates open), a successful biometric information capture is reported, or the device reports the outcome of the match, e.g., match successful. For example, the report hold time frame occurs or at least partially occurs between when formal biometric information is requested (and may be captured) and a device performing the method reports the individual's facial image is successfully captured. In some embodiments, a device performing the method delays opening the access control device 716 or reporting an outcome in order to obtain additional information, e.g., images. In some instances, a device causes a visual cue to be displayed to direct an individual's attention toward a display device such as a monitor or touch screen that is also aligned with an information capture device. In one instance, by doing this, an individual 226 may naturally align his/her face toward the display device and, thus, the capture device, without responding as he/she would if prompted for a formal image, e.g., smiling. This may be preferential as it may permit more accurate facial identification in comparison to an image representing the individual's smiling face.

In some embodiments, opening of the access control device 716 and/or reporting an outcome is delayed several seconds to obtain one or more images. In embodiments, the delay hold is approximately five seconds, five seconds or less, between one to ten seconds, between approximately one to three seconds, less than twenty seconds, at or approximately near twenty seconds or less, and so forth. In embodiments, the time associated with the report hold is designed to be or to approximate a processing delay or a perceived processing delay so that an individual 226 being screened is not aware that additional information is being obtained and may act naturally while still facing the image capture device, e.g., digital camera. In some instances, a device or system performing the method causes a display device to output an innocuous message, like "processing" or "please wait" to cause an individual 226 to direct his/her face toward a display device that may be aligned with a camera. Employing a report hold 808 may beneficial for obtaining information, such as images, that are suitable for use in biometric matching. In some instances, while the formal information is used for matching, information from the report hold period is retained as it is likely suitable for use. The foregoing may occur even when remaining information is discarded. For example, periodically the system deletes video, but retains images associated with a formal image and the report hold for historical purposes.

In embodiments, the approach or approaches taken by one or more devices for locating suitable biometric information can dynamically change based on a variety of factors including, but not limited to, resource demand, individual (e.g., passenger) wait times, individual characteristics (age, facial hair change, etc.), time of day, threat level, to introduce the perception of uncertainty or randomness to individuals being screened, or to obtain information associated with an adjacent individual. In other instances, the approach implemented by a device or system performing the method is varied (e.g., time enlarged) to collect additional information to be included in the record of the individual 226. For example, the method captures (comparatively) more images of a child that obtained a passport three years ago than a child that obtained his/her passport in the last year. Not only can this information be maintained for record purposes, but it may be used to more accurately match the child the next time he/she travels. It should be apparent that the method may adaptively change in such a situation based on biometric characteristics (e.g., perceived age of individual 226) and/or biographic information, e.g., an age associated with a provided token, such as a passport.

An example of the latter situation is when, upon identifying that an adjacent individual has characteristics associated with a child (e.g., an individual of diminutive stature), the system or device performing the method attempts to capture and analyze biometric information earlier on or closer to initial entry than is currently implemented. For example, responsive to determining that a child has entered a predefined area, a system performing the method may attempt to analyze image quality for a subsequent adult during initial entry 802 or moving 804, instead of waiting for the subsequent adult to reach a report hold 808 phase before analyzing the information to determine if it meets the threshold.

CONCLUSION

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. Although headings are used for the convenience of the reader, these are not to be taken as limiting or restricting the systems, techniques, approaches, methods, devices to those appearing in any particular section. Rather, as will be appreciated by one of skill in the art, the teachings and disclosures herein can be combined, rearranged, with other portions of this disclosure and the knowledge of one of ordinary skill in the art. It is the intention of this disclosure to encompass and include such variation.

What is claimed is:

1. A method of verifying an identity of an individual for preventing the individual from entering or leaving a restricted area; said method comprising:
providing an entry collection device comprising a first processor, first tangible memory, a first biometric capture device, a first biographic module; first communication unit for communicating over a network, and a program of instructions configured to cause the entry collection device to perform processes;
the entry collection device capturing biometric information of the individual when the individual attempts to enter or leave the restricted area with the first biometric capture device;
the entry collection device capturing biographic information of the individual when the individual attempts to enter or leave the restricted area using the first biographic module;
the entry collection device generating an entry record including the captured biometric information of the individual and the captured biographic information of the individual;
providing an exit collection device comprising a physical access control device for preventing the individual from entering or exiting the restricted area; a second biometric capture device; a second biographic module; a matching module; a second processor, a second tangible memory containing a first database of exit records for a plurality of individuals, second communication unit for communicating over the network, and a second program of instructions configured to cause the exit collection device perform processes;

providing a central resource comprising a third processor, third tangible memory containing a second database, third communication unit for communicating over the network, and a third program of instructions configured to cause the central resource to perform processes; the central resource storing the entry record in the second database;

receiving by the central resource a manifest from an airline server; determining by the central resource an expected flight time for an individual by utilizing the received manifest;

the central resource generating a list of information comprising biographic and biometric information on the plurality of individuals;

the central resource sending the exit collective device the list of information by way of the third communication unit;

the exit collection device storing in the second tangible memory the list of information;

the exit collection device capturing exit biometric information from an exiting individual when the individual attempts to enter or exit the restricted area;

the exit collection device determining whether data on the list of information matches the exit biographic information;

the matching module providing a match threshold;

the matching module computing a percent match by comparing the biometric information captured by the entry collection device and the biometric information captured by the exit collection device; and the matching module determining whether the percent match is above the match threshold;

if the percent match is not above the match threshold; the matching module executing a failed match process comprising closing by the exit collection device the physical access control device; and if the percent match is above the match threshold; the matching module executing a passed match process comprising opening by the exit collection device the physical access control device;

wherein the exit collection device, central resource, and entry collection device are distinct device each having their own memory, processor, and communication unit for sending and receiving information.

2. The method of claim 1 wherein the entry collection device is a kiosk or mobile phone.

3. The method of claim 1 wherein the physical access control device is a man-trap or electronic gate.

4. The method of claim 1 wherein the second biometric capture device is:

a camera configured to capture a facial image;

a scanner configured to capture fingerprints; or a magnetic or radio frequency identification (RFID) scanner configured to read information encoded in a magnetic or RFID chip associated with a document.

5. The method of claim 1 wherein the physical access control device is physically coupled with the exit collection device into a single unit.

6. The method of claim 1 wherein the physical access control device is communicatively coupled via a wireless communication connection to the exit collection device.

7. The method of claim 1 comprising the step of the matching module iterating comparison until the matching module yields a pass.

8. The method of claim 1 comprising the steps of the matching module iterating comparison until a set number of iterations occurs.

9. The method of claim 1 comprising the steps of the matching module iterating comparison until a predetermined period of time lapses.

10. The method of claim 1 wherein:

the passed match process comprises: providing a visual pass indicator, issuing a pass receipt, collecting additional biometric information, or updating biographic information; and the failed match process comprises: alerting a user, denying passage through the physical access control device, capturing additional biometric information, issuing a fail receipt, or providing a visual indicator to the individual.

11. The method of claim 1 wherein the passed match process comprises providing a visual pass indicator and the failed match process comprises issuing a fail receipt.

12. The method of claim 1 wherein the passed match process and the failed match process comprises collecting additional biometric information.

13. The method of claim 1, wherein the entry record does not comprise an image.

14. The method of claim 1, wherein the entry record comprises a unique identifier.

15. The method of claim 1, wherein the entry record is in Unicode text format or comma separated file format.

16. The method of claim 1, wherein the exit record comprises a unique identifier.

17. The method of claim 1, wherein the exit record is in Unicode text format or comma separated file format.

18. The method of claim 1 wherein the individual is located in a current country; said method further comprising the steps of the central resource verifying that the individual does not meet a predetermined criterion selected from the list consisting of: is wanted by law enforcement, is not permitted to fly, has overstayed a visa, and is not permitted to leave the current country.

19. The method of claim 1 comprising the steps of:

repeating the step of, computing a percent match by comparing the biometric information captured by the entry collection device and the biometric information captured by the exit collection device, three times if the percent match is determined to be below the percent match; and elevating the match threshold from a first level to a second level.

20. The method of claim 1 comprising the steps of dynamically changing the match threshold based on image quality.

21. The method of claim 1 comprising the steps of dynamically changing the match threshold based on whether history information is missing or corrupted.

22. The method of claim 1 comprising the step of the central resource storing entrance records and exit records for a plurality of individuals in the second database.

23. An apparatus configured to verify an identity of an individual for preventing the individual from entering or leaving a restricted area; said apparatus comprising:

an entry collection device comprising a first processor, first tangible memory, a first biometric capture device, a first biographic module; first communication unit for communicating over a network, and a program of instructions configured to cause the entry collection device to perform processes;

the entry collection device configured to capture biometric information of the individual when the individual attempts to enter or leave the restricted area with the first biometric capture device;

the entry collection device configured to capture biographic information of the individual when the individual attempts to enter or leave the restricted area using the first biographic module;

the entry collection device configured to generate an entry record including the captured biometric information of the individual and the captured biographic information of the individual;

an exit collection device comprising a physical access control device for preventing the individual from entering or exiting the restricted area; a second biometric capture device; a second biographic module; a matching module; a second processor, a second tangible memory containing a first database of exit records for a plurality of individuals, second communication unit for communicating over the network, and a second program of instructions configured to cause the exit collection device perform processes;

a central resource comprising a third processor, third tangible memory containing a second database, third communication unit for communicating over the network, and a third program of instructions configured to cause the central resource to perform processes;

the central resource configured to store the entry record in the second database;

the central resource receiving a manifest from an airline server; determining by the central resource an expected flight time for an individual by utilizing the received manifest;

the central resource configured to generate a list of information comprising biographic and biometric information on the plurality of individuals;

the central resource configured to send the exit collective device the list of information by way of the third communication unit;

the exit collection device configured to store in the second tangible memory the list of information;

the exit collection device configured to capture exit biometric information from an exiting individual when the individual attempts to enter or exit the restricted area;

the exit collection device configured to determine whether data on the list of information matches the exit biographic information;

the matching module configured to provide a match threshold;

the matching module configured to compute a percent match by comparing the biometric information captured by the entry collection device and the biometric information captured by the exit collection device; and the matching module configured to determine whether the percent match is above the match threshold;

the matching module configured to execute a failed match process comprising closing by the exit collection device the physical access control device;

the matching module configured to execute a passed match process comprising opening by the exit collection device the physical access control device;

wherein the exit collection device, central resource, and entry collection device are distinct devices each having their own memory, processor, and communication unit for sending and receiving information.

\* \* \* \* \*